United States Patent
Han et al.

(10) Patent No.: US 9,867,056 B2
(45) Date of Patent: Jan. 9, 2018

(54) OPPORTUNISTIC SIGNAL TRANSMISSION FOR INTER-RAT CO-EXISTENCE

(71) Applicant: Intel IP Corporation, Santa Clara, CA (US)

(72) Inventors: Seunghee Han, San Jose, CA (US); Shafi Bashar, Santa Clara, CA (US); Jong-Kae Fwu, Sunnyvale, CA (US); Jeongho Jeon, San Jose, CA (US); Hwan-Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/718,042

(22) Filed: May 20, 2015

(65) Prior Publication Data

US 2016/0100404 A1 Apr. 7, 2016

Related U.S. Application Data

(60) Provisional application No. 62/060,420, filed on Oct. 6, 2014.

(51) Int. Cl.
*H04W 4/00* (2009.01)
*H04W 16/14* (2009.01)
*H04L 5/00* (2006.01)

(52) U.S. Cl.
CPC ............ *H04W 16/14* (2013.01); *H04L 5/00* (2013.01)

(58) Field of Classification Search
None
See application file for complete search history.

(56) References Cited

U.S. PATENT DOCUMENTS

| 2012/0236798 A1* | 9/2012 | Raaf | H04B 7/0452 |
| | | | 370/328 |
| 2013/0343288 A1 | 12/2013 | Ratasuk et al. | |
| 2014/0036853 A1 | 2/2014 | Kim et al. | |
| 2014/0044105 A1 | 2/2014 | Bontu et al. | |
| 2014/0378157 A1 | 12/2014 | Wei et al. | |

(Continued)

FOREIGN PATENT DOCUMENTS

EP 2757850 A1 7/2014

OTHER PUBLICATIONS

International Search Report, dated Dec. 17, 2015, Application No. PCT/US2015/048496, filed Sep. 4, 2015, pp. 3.

*Primary Examiner* — Otis L Thompson, Jr.

(57) ABSTRACT

Various embodiments may be generally directed to techniques for transmitting and receiving one or more reference signals opportunistically within a window over an unlicensed carrier. Various embodiments provide techniques for determining a configuration of the window within an operating environment that may include one or more different radio access technologies (RATs). Various embodiments provide techniques for transmitting the one or more reference signals opportunistically within the window based on an availability of a wireless communications medium. Various embodiments provide techniques for receiving and recovering the one or more reference signals regardless of their location within the window, thereby improving communications in an unlicensed spectrum shared by a variety of different communication devices that may operate according to a variety of different communication protocols.

19 Claims, 10 Drawing Sheets

*100*

(56) References Cited

U.S. PATENT DOCUMENTS

| | | | |
|---|---|---|---|
| 2015/0189574 A1* | 7/2015 | Ng | H04W 24/08 370/252 |
| 2015/0223149 A1* | 8/2015 | Liu | H04W 48/12 370/252 |
| 2015/0223245 A1* | 8/2015 | Cheng | H04L 5/00 370/329 |
| 2015/0264592 A1* | 9/2015 | Novlan | H04L 27/2601 370/252 |
| 2016/0073366 A1* | 3/2016 | Ng | H04W 56/001 370/329 |
| 2016/0088500 A1* | 3/2016 | Chen | H04W 24/08 370/280 |
| 2016/0094374 A1* | 3/2016 | Koorapaty | H04B 7/0626 370/329 |

* cited by examiner

US 9,867,056 B2

OPPORTUNISTIC SIGNAL TRANSMISSION FOR INTER-RAT CO-EXISTENCE

RELATED CASE

This application claims priority to U.S. Provisional Patent Application No. 62/060,420, filed Oct. 6, 2014, the entirety of which is hereby incorporated by reference.

TECHNICAL FIELD

Embodiments herein generally relate to communications between devices in broadband communications networks and the transmission and reception of reference signals within unlicensed frequency spectrum.

BACKGROUND

In an evolved Universal Mobile Telecommunications System Terrestrial Radio Access Network (E-UTRAN), a user equipment (UE) may receive periodic reference signals from the network. When the UE operates within an unlicensed spectrum, however, periodic transmission of reference signals cannot be guaranteed as the network shares the unlicensed spectrum with a variety of communication devices that may operate according to a variety of different communication protocols. As a result, the UE may not receive the reference signals as expected. Accordingly, the UE may not be able to perform certain operations as desired without ensuring reception of the reference signals over the unlicensed spectrum.

DETAILED DESCRIPTION

Figure 1:
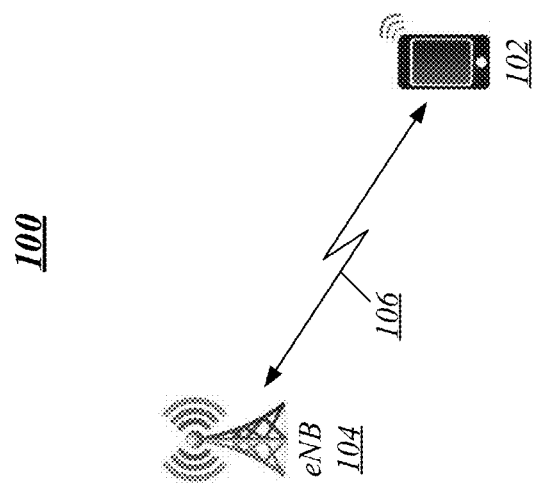
FIG. 1 illustrates an embodiment of a first operating environment.

Various embodiments may be generally directed to techniques for transmitting and receiving one or more reference signals opportunistically within a window over an unlicensed carrier. Various embodiments provide techniques for determining a configuration of the window within an operating environment that may include one or more different radio access technologies (RATs). Various embodiments provide techniques for transmitting the one or more reference signals opportunistically within the window based on an availability of a wireless communications medium. Various embodiments provide techniques for receiving and recovering the one or more reference signals regardless of their location within the window, thereby improving communications in an unlicensed spectrum shared by a variety of different communication devices that may operate according to a variety of different communication protocols.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants. Further, the techniques disclosed herein may involve transmission of data within licensed frequency bands or spectrum or within unlicensed frequency bands or spectrum. Examples of communications over unlicensed frequency spectrum using unlicensed carriers include 3GPP License-Assisted Access (LAA) and LTE-Unlicensed (LTE-U).

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA), High Speed Packet Access (HSPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency Wireless Local Area Network (WLAN) (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of some embodiments in which techniques for opportunistic reference signal transmission and reception may be implemented. The operating environment 100 can include a mobile device 102 and a cellular base station 104. The mobile device 102 can communicate with the base station 104 over a wireless communications interface 106. The mobile device 102 can be a smartphone, tablet, laptop, netbook, or other mobile computing device capable of communicating wireles sly with one or more wireless communication networks. As an example, the mobile device 102 can be a user equipment (UE). The base station 104 can be a cellular base station such as, for example, an evolved node B (eNB). The base station 104 can be a serving cell for the UE 102 such as, for example, a primary or secondary serving cell. The wireless communications interface 106 can be, for example, a 3GPP wireless network interface and the eNB 104 can provide the mobile device 102 with connectivity to a 3GPP wireless access network. The mobile device 102 can also communicate with one or more additional base stations (not shown in FIG. 1), one or more local area network (LAN) access points (not shown in FIG. 1), and/or one or more additional wireless communication devices (not shown in FIG. 1).

The mobile device 102 and the base station 104 can communicate over licensed frequency spectrum. Other devices—including mobile devices and base stations—operating within the same licensed frequency spectrum can operate according to the same communication protocol. By having all devices operate according to the same communication protocol, the base station 104 can periodically transmit reference signals to the mobile device 102. For example, periods of time can be reserved for the transmission of reference signals from the base station 104 to the mobile station 102 such that the transmission of reference signals does not collide or interfere with the transmission of other wireless signals by any other device operating in the same licensed spectrum.

Examples of reference signals that can be transmitted include a cell specific reference signal (CRS), a positioning reference signal (PRS), a channel state information reference signal (CSI-RS), a discovery signal (DRS), a demodulation reference signal, a primary synchronization signal (PSS), and a secondary synchronization signal (SSS). The mobile device 102 can use the reference signals to perform one or more operations including, for example, synchronization operations, demodulation operations, radio resource management (RRM) measurements, and channel state information (CSI) measurements.

As an example, with conventional LTE, one or more of the aforementioned reference signals can be transmitted every 80 milliseconds (ms). That is, the base station 104 can transmit one or more reference signals to the mobile device 102 with a periodicity of 80 ms. The periodic nature of the transmission of the reference signals enables to the mobile device 102 to be able to expect when to receive the reference signals. This in turn can help conserve the resources of the mobile 102 and can enable the mobile device 102 to schedule operations to occur in response to the expected reception of the reference signals.

The mobile device 102 and the base station 104 can alternatively communicate over unlicensed frequency spectrum. Other devices—including mobile devices and base stations—operating within the same unlicensed frequency spectrum can operate according to a variety of different communication protocols. That is, the unlicensed spectrum used by the mobile device 102 and the base station 104 may also be used by a variety of devices that do not operate according to the communication protocol followed by the mobile device 102 and the base station 104. For example, the mobile device 102 and the base station 104 can operate over an unlicensed spectrum also shared and used by one or more WiFi devices. WiFi devices generally operate according to carrier sense multiple access/collision avoidance (CSMA/CA) protocol. Typically, a WiFi device listens to the communication medium first before transmitting to ensure it transmits when no other device is transmitting.

When the mobile device 102 and the base station 104 operate within unlicensed spectrum, transmissions from the base station 104 to the mobile device 102 can collide with transmissions from other devices operating within the same unlicensed band. As such, the base station 104 may not be able to provide reference signals to the mobile device 102 in a precisely periodic manner. That is, when a time occurs to transmit an expected reference signal, the communication medium may be busy (e.g., a WiFi device may already be transmitting and therefore occupying the unlicensed spectrum). This can prevent the base station 104 from being able to transmit the expected reference signal to the mobile device 102 since the transmission is unlikely to be received. Accordingly, periodic transmission of reference signals from the base station 104 to the mobile device 102 cannot be guaranteed when these devices operate in an unlicensed spectrum. Techniques described herein provide an opportunistic manner for ensuring transmission and delivery of such reference signals. More particularly, techniques described herein enable reference signals to be transmitted within a predetermined window, with the actual transmission occurring adaptively within the window based on a determination of when the wireless medium is not busy (i.e., is available).

Discovery measurement timing configuration (DTMC) occasions can be used to enable the reception of reference signals—for example, when a UE operates in licensed spectrum. The DMTC can be network assisted information that aids the UE's efforts to discover the DRS. This information can be configured for each UE and the DRS from one or multiple cells can be found within the DMTC duration. One DMTC can be provided per frequency or component carrier and multiple DMTCs can be provided across different frequencies or component carriers. The UE can measure the DRS within the DMTC which can include a duration (e.g., a search window) of, for example, 6 ms; a periodicity of, for example, 40 ms, 80 ms, or 160 ms; and a subframe offset (e.g., in reference to the primary serving cell) of 0 to one less than a max periodicity. Overall, the UE can expect the DRS transmission from one or more cells within the DMTC duration. Further, the periodicities of DMTC (which can be signaled) and CSI-RS (which can be not signaled) as part of the DRS can be aligned.

Figure 2:
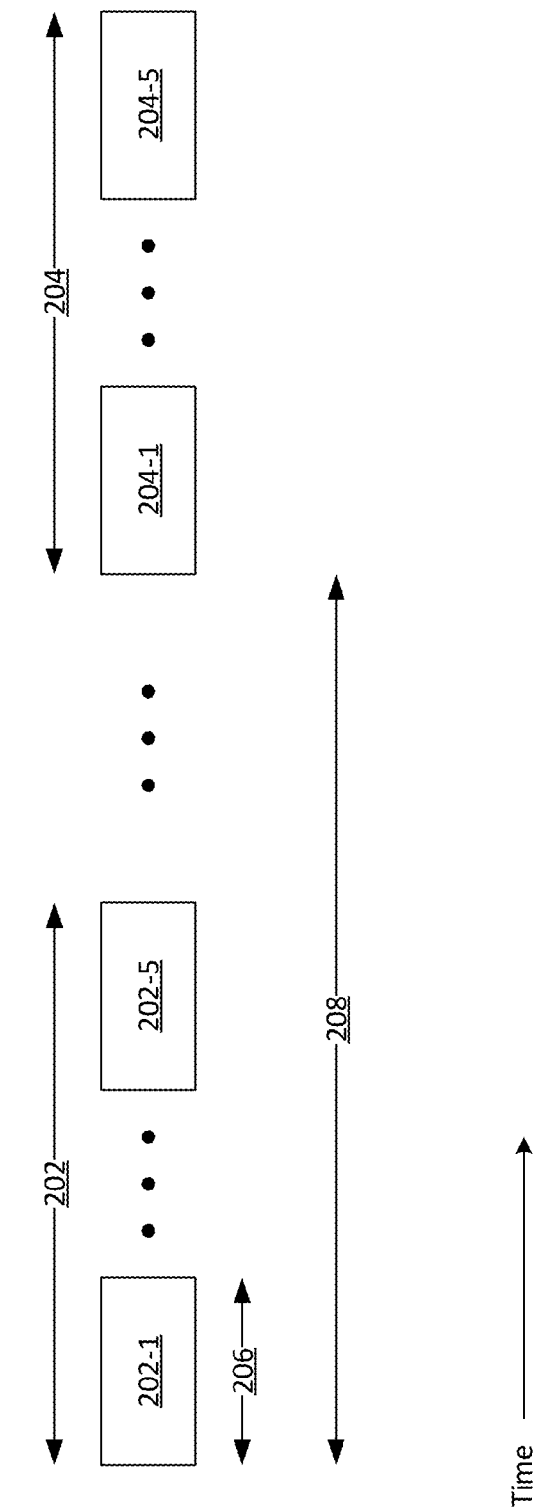
FIG. 2 illustrates an embodiment of periodic discovery signal (DRS) occasions.

FIG. 2 illustrates exemplary periodic discovery signal (DRS) occasions 200. Periodic DRS occasions 200 can be provided, for example, when the UE 102 operates in a licensed spectrum. As shown in FIG. 2, the exemplary periodic discovery signal (DRS) occasions 200 include a first DRS occasion 202 and a second DRS occasion 204. Each DRS occasion 202, 204 can include multiple subframes. For example, the DRS occasions 202, 204 can include the same number of subframes N, where N is an integer. As an example, N can be equal to five (5). The subframes of the first DRS occasion 202 can include subframes 202-1 through 202-5. The subframes of the second DRS occasion 204 can include subframes 204-1 through 204-5. The subframes 202, 204 can each have the same duration 206. Instances of DRS occasions can be periodic—for example, DRS occasions can occur based on a periodicity 208 that can be, for example, 160 ms. One or more reference signals can be transmitted in any subframe within either DRS occasion 202, 204. For example, subframe 202-5 of the first DRS occasion 202 can include PSS, SSS, CRS, and/or CSI-RS reference signals, or any combination thereof. The same reference signals can also be provided in a periodic manner in the second DRS occasion 204—for example, provided in subframe 204-5.

In general, a DRS occasion can include N consecutive subframes (as shown in FIG. 2). As an example, for frequency division duplex (FDD), N can be an integer between one (1) and five (5). As another example, for time division duplex (TDD), N can be an integer between two (2) and five (5). A DRS occasion for a cell can include one instance of PSS and SSS. As an example, the SSS can be positioned in the first subframe of the DRS occasion. CRS can also be transmitted in the DRS occasion. The periodicity of the DRS occasions can be varied and can have durations of, for example, 40 ms, 80 ms, or 160 ms. CSI-RS can also be provided in the DRS occasion. A UE can use the included reference signals within a DRS occasion to perform one of a variety of tasks such as, for example, reporting DRS-based reference signal received power (RSRP), reporting reference signal received quality (RSRQ), and/or reporting associated physical cell identification (Physical Cell ID) or transmission point identification (Transmission Point ID).

Overall, various reference signals can be provided in a variety of manners by varying their placement within constituent subframes and by varying the number of subframes, DRS subframe duration and periodicity, varying DMTC perioditicy and duration, varying offsets, varying the number of transmission points (TPs), and/or adjusting a number of other additional variable transmission parameters including mode of operation (e.g., FDD or TDD). In instances where the UE 102 and the eNB 104 operate in a licensed spectrum, such variation can be controlled and signaled by higher level layers of the network such that the UE 102 can know or expect when to approximately receive the included reference signals, making coordination and subsequent operations based on the recited reference signals more deterministic and predictable.

Figure 3:
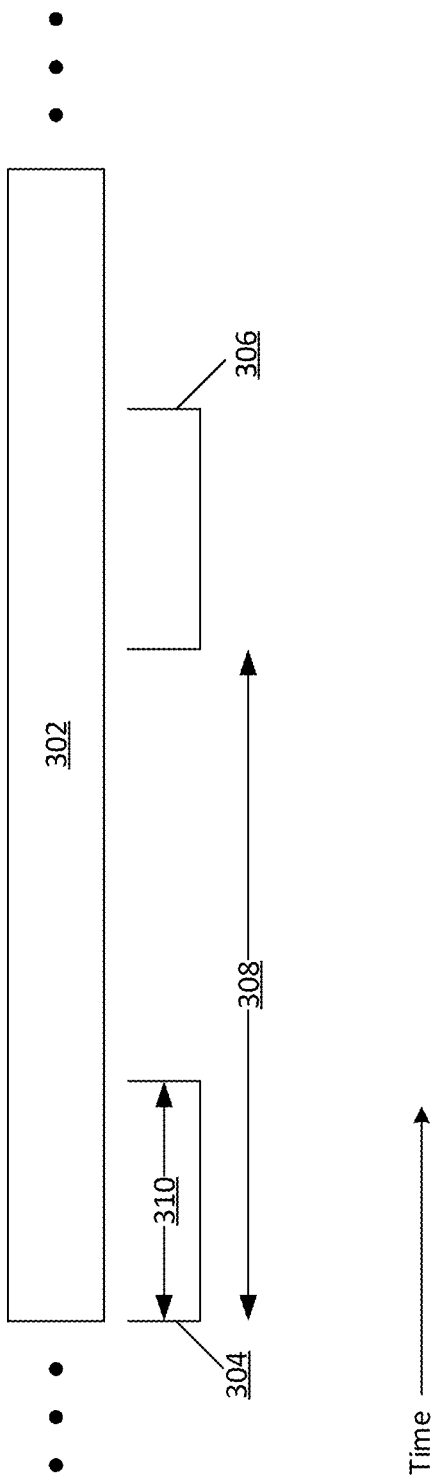
FIG. 3 illustrates an embodiment of opportunistic reference signal transmission.

FIG. 3 illustrates exemplary opportunistic reference signal transmission 300. In particular, FIG. 3 depicts the transmission of reference signals in an opportunistic manner in an unlicensed spectrum—for example, over an unlicensed carrier. The opportunistic reference signal transmission 300 can be conducted in the operating environment 100 and performed and/or exploited by the eNB 104 and the UE 102—for example, when operating in an unlicensed spectrum.

Within the unlicensed spectrum, an unlicensed carrier can provide transmissions 302. Search windows 304 and 306 (also considered candidate windows or candidate search windows) can be configured for the UE 102 within portions of the transmissions 302. The search windows 304, 306 can designate times during which one or more reference signals may be transmitted by the eNB 104. The search windows 304 can be configured to include an offset as measured, for example, from a start of the search windows 304, 306, respectively. The search windows 304, 306 can be configured or established based on a periodicity 308 (e.g., a candidate window periodicity). The search windows 304, 306 can be of the same duration 310 (e.g., a candidate window duration).

The configuration of the search windows 304, 306, including any offsets and/or the periodicity 308, can be established by prior communications or signaling between the eNB 104 and the UE 102. The UE 102 can operate under the assumption that one or more reference signals will be transmitted within the configured search windows 304, 306. Since the reference signals are known (e.g., can include known information or signaling), the UE 102 can perform measurement and detection operations to determine if the one or more reference signals were indeed transmitted. That is, the UE 102 can process communications received during a configured search window (such as search window 304) to determine if a reference signal transmitted by the eNB 104 was received. In various embodiments, a detection operation can be performed by comparing any received transmissions within a search window 304, 306 to one or more known fixed patterns representative of the one or more reference signals.

One or more reference signals can be transmitted during the configured search windows 304, 306 if the wireless communication medium over which the eNB 104 and the UE 102 communicate is not busy (e.g., if no other communication device is transmitting at the same time over the same frequency range). The reference signals may not be transmitted if the wireless communication medium is busy (or may be transmitted with a delay but still within a configured search window if the medium becomes free during a time within the configured search window).

If the reference signal to be transmitted during the configured search windows 304, 306 is a DRS, then the transmission of the DRS can be considered to be an opportunistic DRS (ODRS) transmission. As an example, the eNB 104 can attempt to transmit one or more reference signals (and/or a DRS) adaptively based on a listen before talk (LBT) medium access protocol (including, for example, CSMA/CA). Overall, the eNB 104 can opportunistically attempt to transmit one or more reference signals according to a shared communications medium co-existence mechanism to ensure compatibility and co-existence with other radio access technologies (RATs) including, for example, WiFi. The shared communications medium co-existence mechanism can also provide compatibility and co-existence with other cellular operators deploying the same RAT in the same unlicensed carrier. In this way, the UE 102 can operate under the assumption that one or more reference signals may be provided somewhere within the predetermined search windows 304, 306—and will be transmitted on an adaptive basis based on the availability of the carrier/frequency band used for transmission. The UE 102 can then receive transmissions during the search windows 302, 304 and then perform detection operations to recover the one or more transmitted reference signals.

In various embodiments, the search windows 304, 306 can be configured to be aligned with the DMTC or DRS occasions (or both) for a cell. The UE 102 can therefore perform measurements based on the DMTC or DRS occasions for a cell to determine if the DRS was actually transmitted or not. Hypothesis testing can be implemented by the UE 102 to determine if the DRS was transmitted and received and detected.

In contrast to conventional transmission of reference signals, techniques disclosed herein provide enhanced flexibility since actual reference signal transmissions can be made in any subframe (as opposed to being restricted to certain subframes) and can be found by detection techniques implemented by the UE 102. These techniques ensure that reference signal transmissions can co-exist with the unpredictable availability of the medium of an unlicensed spectrum since fixed transmission patterns need not be used or strictly followed. Further, techniques described herein enable reference signals to be located or positioned within the subframes relative to one another. For example, a first type of reference signal can be transmitted first with the location of any additional reference signals determined relative to the first type of reference signal (e.g., a first type of reference signal can be positioned in a first received subframe within the window and a second type of reference signal can be positioned within two subframes of the first received subframe). Such techniques can increase the predictability of recovering reference signals.

In various embodiments, a DRS transmission according to the techniques described herein can include the SSS transmitted within the first subframe of a DRS occasion. In various embodiments, the PSS can also be transmitted in the first subframe of the DRS occasion—for example, for FDD operation. In various embodiments, the PSS can be transmitted in the second subframe (e.g., in a downlink (DL) subframe or a downlink pilot time slot (DwPTS) of the DRS occasion—for example, for TDD operation. In various embodiments in which the UE 102 operates under FDD, the UE 102 can identify a subframe index (e.g., indices zero (0) to five (5)) by detecting SSS and PSS. Additional reference signals can be located or positioned within the window/subframes based on these initially located reference signals.

According to the techniques disclosed herein, transmission of SSS and PSS as a pair can occur within any subframe within the DRS occasion subject to the availability of the transmission medium. As such, the subframe location of the SSS/PSS pair is not necessarily tied to the subframe index.

Further, in accordance with techniques disclosed herein, CRS and/or CSI-RS can be transmitted during any subframe. In contrast to conventional reference signal transmission, CRS and/or CSI-RS may or may not be present in a subframe within the DRS occasion.

In various embodiments, DRS can be transmitted in a single subframe within a DRS occasion. As an example, the duration of the DRS occasion can be five (5) subframes, with one of the subframes possibly including the DRS. To determine if the DRS is included in one of the subframes, the UE 102 can perform measurement detection and testing. If located, the DRS can then be used to perform additional operations by the UE 102.

Figure 4:
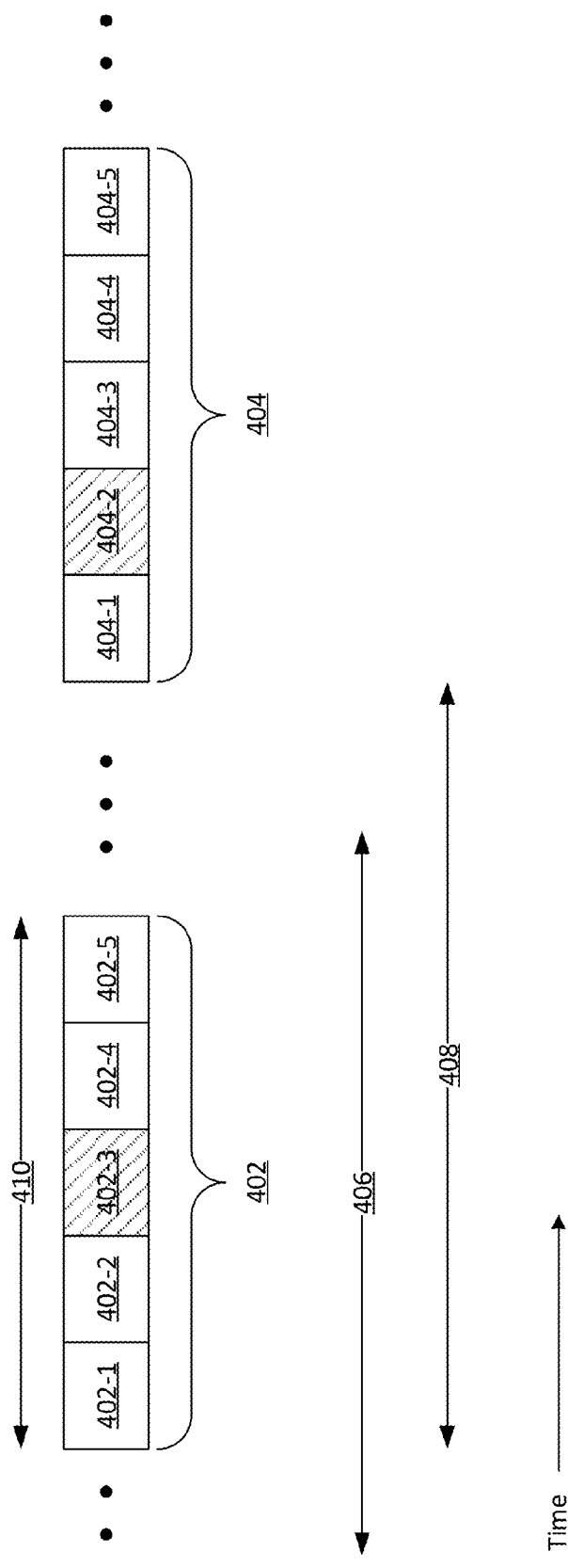
FIG. 4 illustrates an embodiment of opportunistic reference signal transmission based on discovery measurement timing configuration (DMTC) and DRS occasion.

FIG. 4 illustrates exemplary opportunistic reference signal transmission 400 based on DMTC and DRS occasions. As shown in FIG. 4, a first DRS occasion 402 and a second DRS occasion 404 are depicted. Each DRS occasion 402, 404 can include the same number of subframes. As an example, each DRS occasion 402, 404 can include five (5) subframes—subframes 404-1 through 402-5 for the first DRS occasion 402 and subframes 404-1 through 404-5 for the second DRS occasion 404. The durations of the DRS occasions 402, 404 can be approximately equal with a duration 410 as shown in FIG. 4.

In various embodiments, a DMTC occasion can be configured as the search window to be used by the UE 102. The DMTC duration 406 (i.e., the search window) is shown in FIG. 4. The DMTC can occur periodically with a periodicity 408 as shown in FIG. 4. A DRS occasion (e.g., DRS occasion 402, 404) can occur within a DMTC occasion. The UE 102 can operate under the assumption that a DRS will be attempted to be provided within the DRS occasions 402, 404. As an example, a DRS including PSS, SSS, and CRS can be provided in a single subframe. Which subframe includes the DRS can be varied across each DRS occasion 402, 404 based on the availability of the medium. For example, subframe 402-3 (shown in FIG. 4 as shaded) can include the DRS and subframe 404-2 (shown in FIG. 4 as shaded) can include the DRS. In various embodiments, for TDD operation, two subframes can be used for the DRS occasions.

In various embodiments, various reference signals—such as, for example, PSS/SSS, CRS, and/or CSI-RS can be defined or preconfigured to be transmitted across one or more subframes. The location of each of these reference signals can be configured based on prior communications or signaling between the eNB 104 and the UE 102. As an example, any of the PSS, SSS, CRS, and/or CSI-RS signals can be expected to be located in specific subframes or can be expected to be located in specific subframes based on the relative location of any other reference signal.

In general, coordination between the UE 102 and the eNB 104 prior to actual transmission of the one or more reference signals can establish an expected window for transmissions and receptions—for example, a candidate window or a search window as may be referred to herein. The UE 102 can monitor the window for inclusion of one or more reference signals transmitted by the eNB 104 opportunistically. The expected window can be configured based on a duration, a periodicity, and/or a number of included subframes. The positioning of the one or more reference frames can be predefined or predetermined with the understanding that each reference signal transmission is opportunistically made based on the availability of the wireless medium. For example, all reference signals can be expected to be positioned within the first subframe of a window; however, the reference signals may be all positioned in the second subframe of the window if the wireless medium is busy during a time when the first subframe is scheduled to be transmitted (thereby preventing the eNB 104 from transmitting during a time corresponding to the first subframe). The UE 102 can receive any transmissions during the entire window and can perform detection operations to recover the one or more reference signals. While the UE 102 may expect the reference signals to be found within the first subframe, detection testing may result in no reference signals being included. In such a scenario, the UE 102 can simply perform detection operations on the subsequent subframes until the expected reference signals are recovered. By having the UE 102 perform detection operations within the window, the variability in the availability of the wireless medium can be mitigated to ensure reference signals are still provided to the UE 102.

Referring back to FIG. 4, in various embodiments, the DRS can be preconfigured or predetermined to be transmitted during any subframe within a predetermined candidate window. The configuration of the search window and the specific subframe expected to contain the DRS can be communicated between the UE 102 and eNB 104 prior to transmitting a DRS. Further, in various embodiments, the DRS may or may not be transmitted in an expected subframe of an expected candidate window based on the availability of the wireless medium. For example, although a particular subframe is preconfigured as expected to contain the DRS, the DRS may be transmitted in another subframe within the window. This scenario may occur when the medium is busy during a time when the DRS is expected to be transmitted. As a result, the DRS may be transmitted in a later subframe within the window (or not at all if the medium is busy during the entire window).

Figure 5:
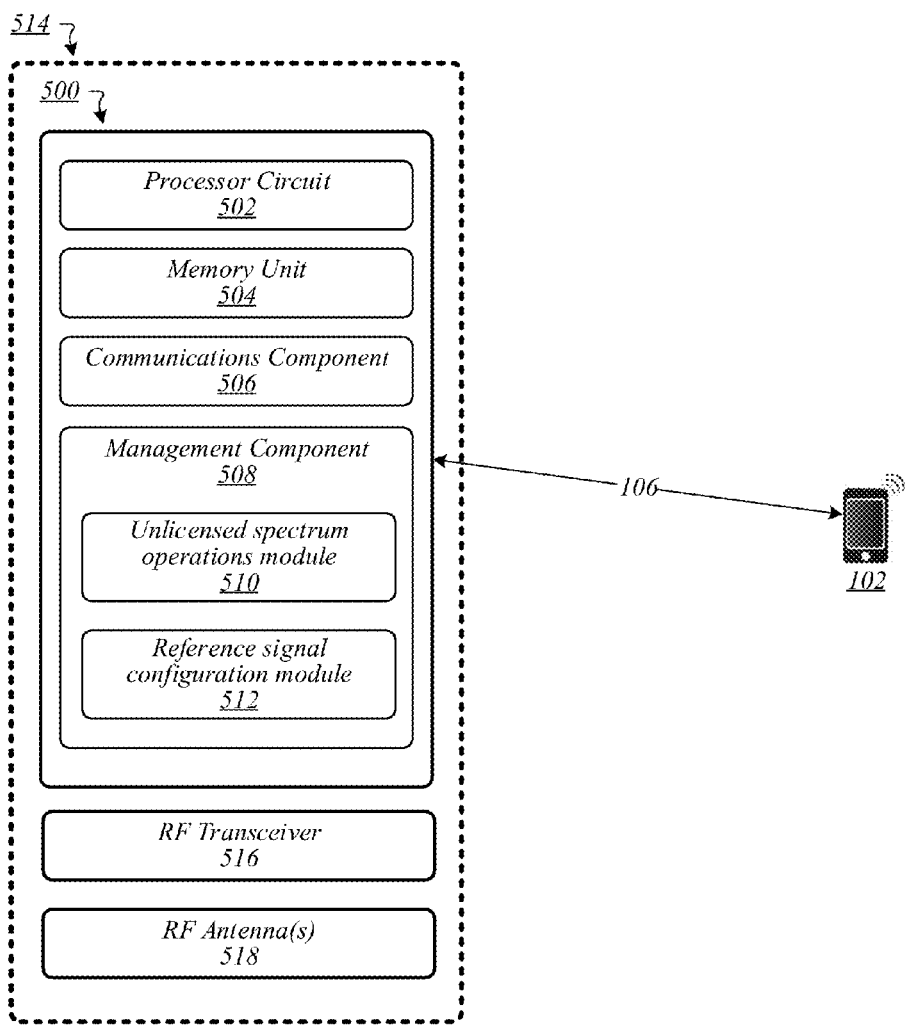
FIG. 5 illustrates an embodiment of a first apparatus and an embodiment of a first system.

FIG. 5 illustrates a block diagram of an apparatus 500. Apparatus 500 may be representative of an eNB that implements techniques for opportunistic reference signal transmission as described herein (e.g., eNB 104). As shown in FIG. 5, apparatus 500 can comprise multiple elements including a processor circuit 502, a memory unit 504, a communications component 506, and a management component 508. The embodiments, however, are not limited to the type, number, or arrangement of elements shown in this figure.

In some embodiments, the apparatus 500 may comprise processor circuit 502. Processor circuit 502 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 502 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 502 may be implemented as a general purpose processor, such as a processor made by Intel® Corporation, Santa Clara, Calif. The embodiments are not limited in this context.

In various embodiments, apparatus 500 may comprise or be arranged to communicatively couple with a memory unit 504. Memory unit 504 may be implemented using any machine-readable or computer-readable media capable of storing data, including both volatile and non-volatile memory. For example, memory unit 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in some embodiments. The embodiments are not limited in this context.

In various embodiments, apparatus 500 may comprise a communications component 506. Communications component 506 may comprise logic, circuitry, and/or instructions operative to send messages to one or more remote devices and/or to receive messages from one or more remote devices. In some embodiments, communications component 506 may be operative to send and/or receive messages over one or more wired connections, one or more wireless connections, or a combination of both. In various embodiments, communications component 506 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 500 may comprise a management component 508. Management component 508 may comprise logic, circuitry, and/or instructions operative to manage functional operations of the apparatus 500 including directing the communications component 506 to generate and transmit messages and/or to receive and process messages. The embodiments are not limited in this context.

FIG. 5 also illustrates a block diagram of a system 514. System 514 may comprise any of the aforementioned elements of apparatus 500. System 514 may further comprise a radio frequency (RF) transceiver 516. RF transceiver 516 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 516 may operate in accordance with one or more applicable standards in any version. The embodiments are not limited in this context.

In various embodiments, system 514 may comprise one or more RF antennas 518. Examples of any particular RF antenna 518 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 516 may be operative to send and/or receive messages and/or data using one or more RF antennas 518. The embodiments are not limited in this context.

In various embodiments, communications component 506 may be operative to transmit and receive messages with the UE 102. Communication with the UE 102 can be implemented over the wireless communications interface 106. The communications component 506 can transmit and receive signals over unlicensed spectrum using one or more unlicensed carriers. The communications component 506 can operate based on directions provided by the management module 508.

In various embodiments, the management component 508 can include an unlicensed spectrum operations module 510 and a reference signal configuration module 512. The management module 508 can direct communications with remote devices including, for example, the UE 102. The management module 508 can vary the characteristics of communications by the communications component 506—including the varying the protocol, timing, and type of communications made by the communications component 506.

In various embodiments, the unlicensed spectrum operations module 510 can determine the characteristics of the operating environment in which the apparatus 500 operates. As an example, the unlicensed spectrum operations module 510 can determine if the operating environment is within a licensed or an unlicensed spectrum and if communications are to be made over a licensed or an unlicensed network. The unlicensed spectrum operations module 510 can determine characteristic of other devices and systems operating within the same environment. For example, the unlicensed spectrum operations module 510 can determine the types of RATs that may co-exist within the same environment and the various communication protocols used by devices operating within the same environment.

In various embodiments, the unlicensed spectrum operations module 510 can determine a type of communication protocol to be used by the apparatus 500 when communicating with the UE 102. As an example, different communication protocols can be determined to be used depending upon whether the apparatus is operating in a licensed spectrum or an unlicensed spectrum. Further, the unlicensed spectrum operations module 510 can determine over what frequencies, carriers, or RAT to use for communication. Parameters or characteristics governing communication by the apparatus 500 with the UE 102 can be adjusted based on the operating environment of the apparatus 500. In various embodiments, when operating in an unlicensed spectrum, the unlicensed spectrum operations module 510 can determine that the apparatus 500 (e.g., the communications component 506) is to implement a LBT protocol. In various embodiments, the unlicensed spectrum operations module 510 can determine parameters for communication in a particular environment by receiving environment information from the network or from one or more devices operating in the same environment.

In various embodiments, the reference signal configuration module 512 can determine the configuration of any reference signals transmitted by the apparatus 500. The reference signal configuration module 512 can determine or set a search window or transmission window for transmitting one or more reference signals. As an example, the reference signal configuration module 512 can determine that a search window or transmission window is to be a DMTC occasion, DRS occasion, or both. The reference signal configuration module 512 can determine the types of reference signals to be transmitted or attempted to be transmitted during the configured window. As an example, the reference signal configuration module 512 can transmit one or more of PSS, SSS, CRS, and CSI-RS, or any other reference signal discussed herein. The reference signal configuration module 512 can also determine how to distribute transmission of the reference signals over one or more subframes. As an example, the reference signal configuration module 512 can transmit all or a portion of the reference signals in a single subframe. Alternatively, the reference signals can be transmitted across two or more subframes. Further, the reference signals can be located in subframes relative to one another subframe containing a certain reference signal.

In various embodiments, the management component 508—based on a configuration for transmitting one or more reference signals based on determinations from the reference signal configuration module 512 and based on communication operations determined by the unlicensed spectrum operations module 510—can direct the communications component to opportunistically transmit one or more reference signals in accordance with a communications protocol determined appropriate for an operating environment of the apparatus 500. As an example, the management component 508 can direct the communications component 506 to transmit the one or more reference signals based on a LBT protocol. Further, the management component 508 can direct the communications component 506 to delay or re-attempt a scheduled transmission when the wireless medium is busy. As an example, the management component 508 can direct the communications component 506 to attempt a transmission after a delay (e.g., a random delay) or after waiting until the medium is not busy (e.g., with the attempted transmission still occurring within the preconfigured window).

Further, the management component 508 can direct the communications component 506 to transmit any reference signal configuration information (e.g., as determined by the reference signal configuration module 512) to the UE 102 to enable to the UE 102 to determine when to expect future reference signal transmissions. Reference signal transmission information can include, as discussed above, a search window, type of reference signals, and subframe allocation of the reference signals.

In various embodiments, the management component 508 can receive and process any acknowledgements received from the UE 102 based on receiving any transmitted reference signal. Further, the management component 508 can receive and process any reporting information transmitted by the UE 102 based on one or more received reference signals.

Figure 6:
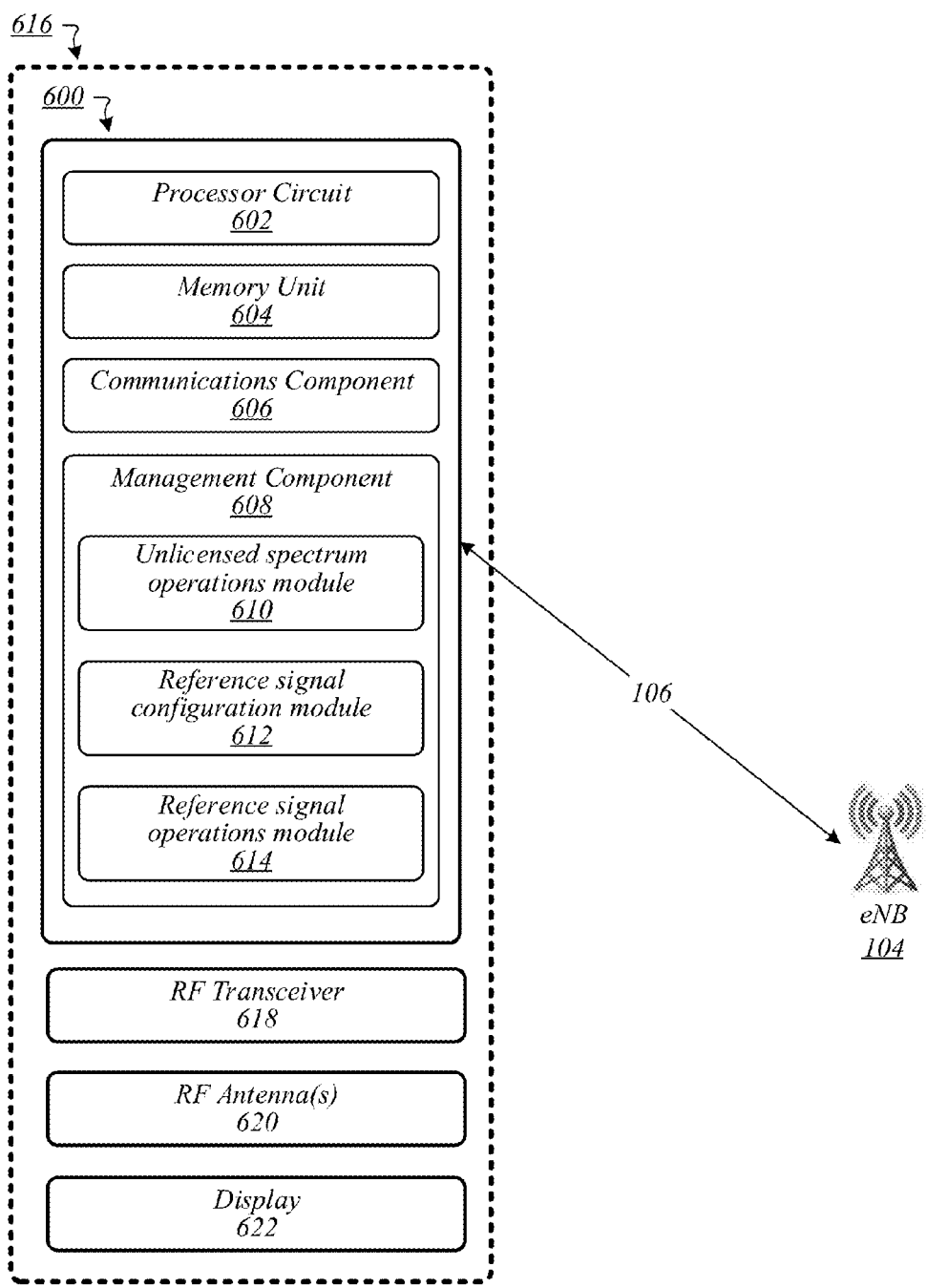
FIG. 6 illustrates an embodiment of a second apparatus and an embodiment of a second system.

FIG. 6 illustrates a block diagram of an apparatus 600. Apparatus 600 may be representative of a UE that implements techniques for opportunistic reference signal reception as described herein (e.g., UE 102). As shown in FIG. 6, apparatus 600 can comprise multiple elements including a processor circuit 602, a memory unit 604, a communications component 606, and a management component 608. The embodiments, however, are not limited to the type, number, or arrangement of elements shown in this figure.

In some embodiments, apparatus 600 may comprise processor circuit 602. Processor circuit 602 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 602 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 602 may be implemented as a general purpose processor, such as a processor made by Intel® Corporation, Santa Clara, Calif. The embodiments are not limited in this context.

In various embodiments, apparatus 600 may comprise or be arranged to communicatively couple with a memory unit 604. Memory unit 604 may be implemented using any machine-readable or computer-readable media capable of storing data, including both volatile and non-volatile memory. For example, memory unit 604 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in some embodiments. The embodiments are not limited in this context.

In various embodiments, apparatus 600 may comprise a communications component 606. Communications component 606 may comprise logic, circuitry, and/or instructions operative to send messages to one or more remote devices and/or to receive messages from one or more remote devices. In some embodiments, communications component 606 may be operative to send and/or receive messages over one or more wired connections, one or more wireless connections, or a combination of both. In various embodiments, communications component 606 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 600 may comprise a management component 608. Management component 608 may comprise logic, circuitry, and/or instructions operative to manage functional operations of the apparatus 600 including directing the communications component 606 to generate and transmit messages and/or to receive and process messages. The embodiments are not limited in this context.

FIG. 6 also illustrates a block diagram of a system 616. System 616 may comprise any of the aforementioned elements of apparatus 600. System 616 may further comprise a radio frequency (RF) transceiver 618. RF transceiver 618 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 618 may operate in accordance with one or more applicable standards in any version. The embodiments are not limited in this context.

In various embodiments, system 616 may comprise one or more RF antennas 620. Examples of any particular RF antenna 620 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 618 may be operative to send and/or receive messages and/or data using one or more RF antennas 620. The embodiments are not limited in this context.

In various embodiments, system 616 may comprise a display 622. Display 622 may comprise any display device capable of displaying information received from processor circuit 602. Examples for display 622 may include a television, a monitor, a projector, and a computer screen. In one embodiment, for example, display 622 may be implemented by a liquid crystal display (LCD), light emitting diode (LED) or other type of suitable visual interface. Display 622 may comprise, for example, a touch-sensitive display screen ("touchscreen"). In some implementations, display 622 may comprise one or more thin-film transistors (TFT) LCD including embedded transistors. The embodiments, however, are not limited to these examples.

In various embodiments, communications component 606 may be operative to transmit and receive messages with the eNB 104. Communication with the eNB 104 can be implemented over the wireless communications interface 106. The communications component 606 can transmit and receive signals over unlicensed spectrum using one or more unlicensed carriers. The communications component 606 can operate based on directions provided by the management module 608.

In various embodiments, the management component 608 can include an unlicensed spectrum operations module 610, a reference signal configuration module 612, and a reference signal operations module 614. The management module 608 can direct communications with remote devices including, for example, the eNB 104. The management module 608 can vary the characteristics of communications by the communications component 606—including varying the protocol, timing, and type of communications made by the communications component 606.

In various embodiments, the unlicensed spectrum operations module 610 can determine a type of communication protocol to be used by the apparatus 600 when communicating with the eNB 104. As an example, different communication protocols can be determined to be used depending upon whether the apparatus 600 is operating in a licensed spectrum or an unlicensed spectrum. Further, the unlicensed spectrum operations module 610 can determine over what frequencies, carriers, or RAT to use for communication. Parameters or characteristics governing communication by the apparatus 600 with the eNB 104 can be adjusted based on the operating environment of the apparatus 600. In various embodiments, when operating in an unlicensed spectrum, the unlicensed spectrum operations module 610 can determine that the apparatus 600 (e.g., the communications component 606) is to implement a LBT protocol. The unlicensed spectrum operations module 610 can determine the operating environment and/or characteristics for communication based on received communications from the eNB 104.

In various embodiments, the reference signal configuration module 612 can determine the configuration of any reference signals to be transmitted to the apparatus 600. As an example, the reference signal configuration module 612 can determine, based on communications with the eNB 104, how one or more reference signals will be transmitted or attempted to be transmitted to the apparatus 600. In various embodiments, the eNB 104 can communicate to the apparatus 600 one or more parameters related to the transmission of reference signals including, for example, a search window, a periodicity of the search window, a type of reference signal to be transmitted, and the positioning of the reference signals across on or more subframes included in the search window. In this way, the reference signal configuration module 612 can determine when one or more reference signals may be transmitted so that the apparatus 600 can adjust operation to attempt detection of the reference signals. The reference signal configuration module 612 can direct the communications component 606 to attempt to receive and detect any reference signals transmitted based on parameters as determined by the reference signal configuration module 612.

In various embodiments, the reference signal operations module 614 can use one or more received reference signals to perform one or more tasks or operations based on the received reference signals. In various embodiments, the reference signal operations module 614 can use one or more received reference signals to measure or assess channel characteristics, received power, and/or signal quality and can report one or more metrics indicating the same to the eNB 104. As an example, the reference signal operations module 614 can facilitate reporting of DRS-based reference signal received power (RSRP), reporting of reference signal received quality (RSRQ), and/or reporting of associated physical cell identification (Physical Cell ID) or transmission point identification (Transmission Point ID). Overall, the reference signal operations module 614 can use the received reference signals to perform operations as requested by the eNB 104 and/or to perform operations relating to communications monitoring or evaluation.

Figure 7:
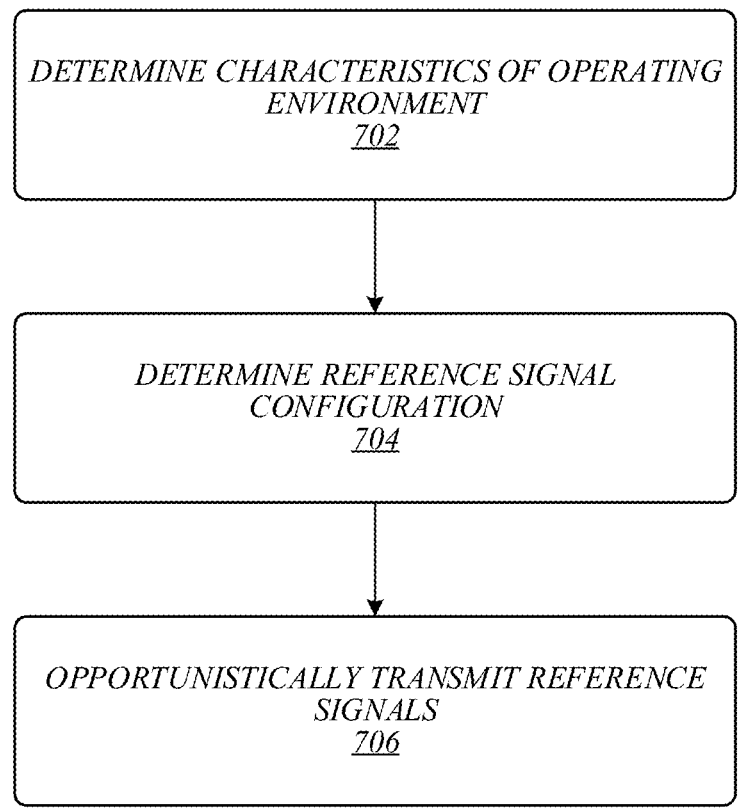
FIG. 7 illustrates an embodiment of a first logic flow.

FIG. 7 illustrates one embodiment of a logic flow 700, which may be representative of the operations executed by one or more embodiments described herein. More particularly, logic flow 700 may be representative of operations that may be performed in some embodiments by apparatus 500 and/or system 514 of FIG. 5 and/or eNB 104.

As shown in logic flow 700, characteristics of an operating environment may be determined at 702. As an example, it can be determined that the operating environment involves operation in an unlicensed spectrum. It can also be determined that the operating environment includes one or more additional RATs. Additionally, one or more communication protocols or co-existence mechanisms appropriate for the particular operating environment can be determined. In various embodiments, it can be determined that a LBT communication protocol is to be implemented and/or communication based on CSMA/CA. In various embodiments, additional characteristics or parameters for conducting communications in a determined operating can be determined including, for example, carrier frequencies or frequency bands of operation. Additionally, it can be determined that the environment is one of LAA or LTE-U.

At 704, configuration of reference signal transmission can be determined. Configuration of any reference signal transmission can be based on the operating environment determined at 702. In various embodiments, configuration of reference signal transmission can vary based on whether it is determined the operating environment involves communication over a licensed or an unlicensed spectrum. Configuration of reference signal transmission can include determine various parameters for determine how to transmit one or more reference signals including, for example, a search window/transmission window for transmitting the one or more reference signals, a carrier for transmission, what types of reference signals to transmit, and the location or positioning of the reference signals across one or more subframes within the search/transmission window. A periodicity of the window can also be determined In various embodiments, the search/transmission window can be a DMTC occasion, a DRS occasion, or both. In various embodiments, it can be determined to transmit the one or more reference signals over an unlicensed carrier (e.g., within an unlicensed frequency band of operation). In various embodiments, it can be determined to transmit a DRS signal and/or one or more of a PSS, SSS, CSI-RS, PRS, and CRS, or any other reference signal described herein. In various embodiments, a periodicity of the search/transmission window can be determined. Additionally, in various embodiments, the location of the reference signals to be transmitted across one or more subframes within the search/transmission frame can be determine, including positioning the reference signals relative to one another in a predetermined manner. At 704, in various embodiments, one or more parameters governing transmission of the one or more reference signals can be communicated to a remote device such as, for example, the UE 102. The UE 102 can also provide a reply communication at 704 acknowledging receipt of the configuration information.

At 706, the configured reference signals can be transmitted to one or more remote devices. Transmission of the one or more reference signals can be based on use of the communication medium. Transmission can be attempted during the configured or predetermined search/transmission window. If the communication medium is busy, then transmission of the one or more reference signals can be delayed until a time later within the search/transmission window when the communication medium is not buy or is free. As an example, transmission can be attempted after a delay. The delay can be a random amount of time. Attempted transmission can occur within the original configured window. In this way, the one or more reference signals can be adaptively transmitted based on the availability of the wireless communication medium.

In various embodiments, transmission can be attempted in an opportunistic manner. That is, a co-existence mechanism for sharing a communication medium can be used—e.g., LBT—such that a scheduled transmission occurs when the medium is not busy. Because a search/transmission window is predefined and can be known to a remote device, opportunistic transmission within the search/transmission window increases the likelihood that the one or more reference signals are received by the remote device. If reception is effectuated, a reply communication can be received at 706 acknowledging the same.

Figure 8:
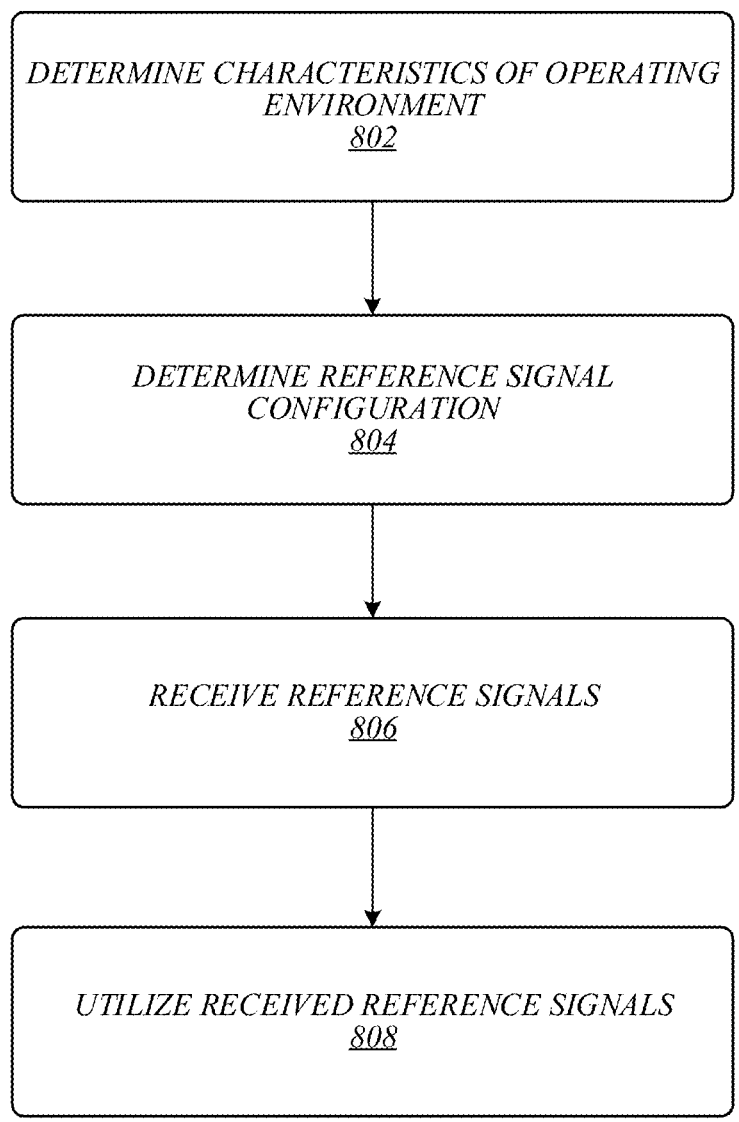
FIG. 8 illustrates an embodiment of a second logic flow.

FIG. 8 illustrates one embodiment of a logic flow 800, which may be representative of the operations executed by one or more embodiments described herein. More particularly, logic flow 800 may be representative of operations that may be performed in some embodiments by apparatus 600 and/or system 616 of FIG. 6 and/or UE 102.

As shown in logic flow 800, characteristics of an operating environment may be determined at 802. As an example, it can be determined that the operating environment involves operation in an unlicensed spectrum. It can also be determined that the operating environment includes one or more additional RATs. Additionally, one or more communication protocols or co-existence mechanisms appropriate for the particular operating environment can be determined. In various embodiments, it can be determined that a LBT communication protocol is to be implemented and/or communication based on CSMA/CA. In various embodiments, additional characteristics or parameters for conducting communications in a determined operating can be determined including, for example, carrier frequencies or frequency bands of operation. Additionally, it can be determined that the environment is one of LAA or LTE-U. Information directed to the operating environment can be provided by a remote device such as, for example, the eNB 104.

At 804, configuration of reference signal reception can be determined. Configuration of reference signal reception can be based on the operating environment determined at 702, including information provided by a remote device such as, for example, the eNB 104. In various embodiments, configuration of reference signal reception can vary based on whether it is determined the operating environment involves communication over a licensed or an unlicensed spectrum. Configuration of reference signal reception can include determining various parameters for how to attempt to receive one or more reference signals including, for example, a search window for receiving the one or more reference signals, a carrier for reception, what types of reference signals may be received, and the location or positioning of the reference signals across one or more subframes within the search window. A periodicity of the window can also be determined. These parameters can be provided by the eNB 104 prior to attempting to transmit and receive the reference signals in an opportunistic manner.

At 806, reception of the configured reference signals can be attempted. Based on the parameters related to configuration of transmission of the one or more reference signals, reception of the reference signals can be attempted. Reception can be attempted by monitoring the configured search or candidate window for inclusion of any expected reference signals. In various embodiments, reference signal measurement or detection operations can be performed during the configured search window to determine if one or more reference signals were transmitted and received. That is, detection operations for determining if known or expected signals were received during the search window can be implemented. Detection operations can include comparing transmissions received during a window to known fixed patterns that are presentative of the reference signals such that a comparison operation can be made to determine if a particular reference signal was indeed received.

These detection operations can account for opportunistic transmission of the one or more reference signals such that the one or more reference signals can be detected when transmitted during any subframe within the search window.

That is, reception can be performed adaptively to account for the adjustable location/positioning of the reference signals within any portion of an expected reception window—based on any variation between an expected location of the reference signals and an actual location in view of the availability of the wireless communication medium. Attempted reception of the one or more reference signals can be performed periodically and can be based on any information provided by the eNB 104. In various embodiments, at 806, reception of any reference signal can prompt transmission of a reply acknowledging the same. Any of the aforementioned reference signals can be received and detected at 804.

At 808, operations can be performed based on any received reference signal. That is, the one or more reference signals can be utilized by the UE 102. In various embodiments, one or more performance metrics or signal or channel quality metrics can be determined based on a received reference signal. As an example, DRS-based reference signal received power (RSRP), reference signal received quality (RSRQ), and/or associated physical cell identification (Physical Cell ID) or transmission point identification (Transmission Point ID) can be determined and reported by transmission of the same to the eNB 104. Overall, at 808, performance measurements can be performed based on the received reference signals with the resulting information transmitted to the eNB 104.

Figure 9:
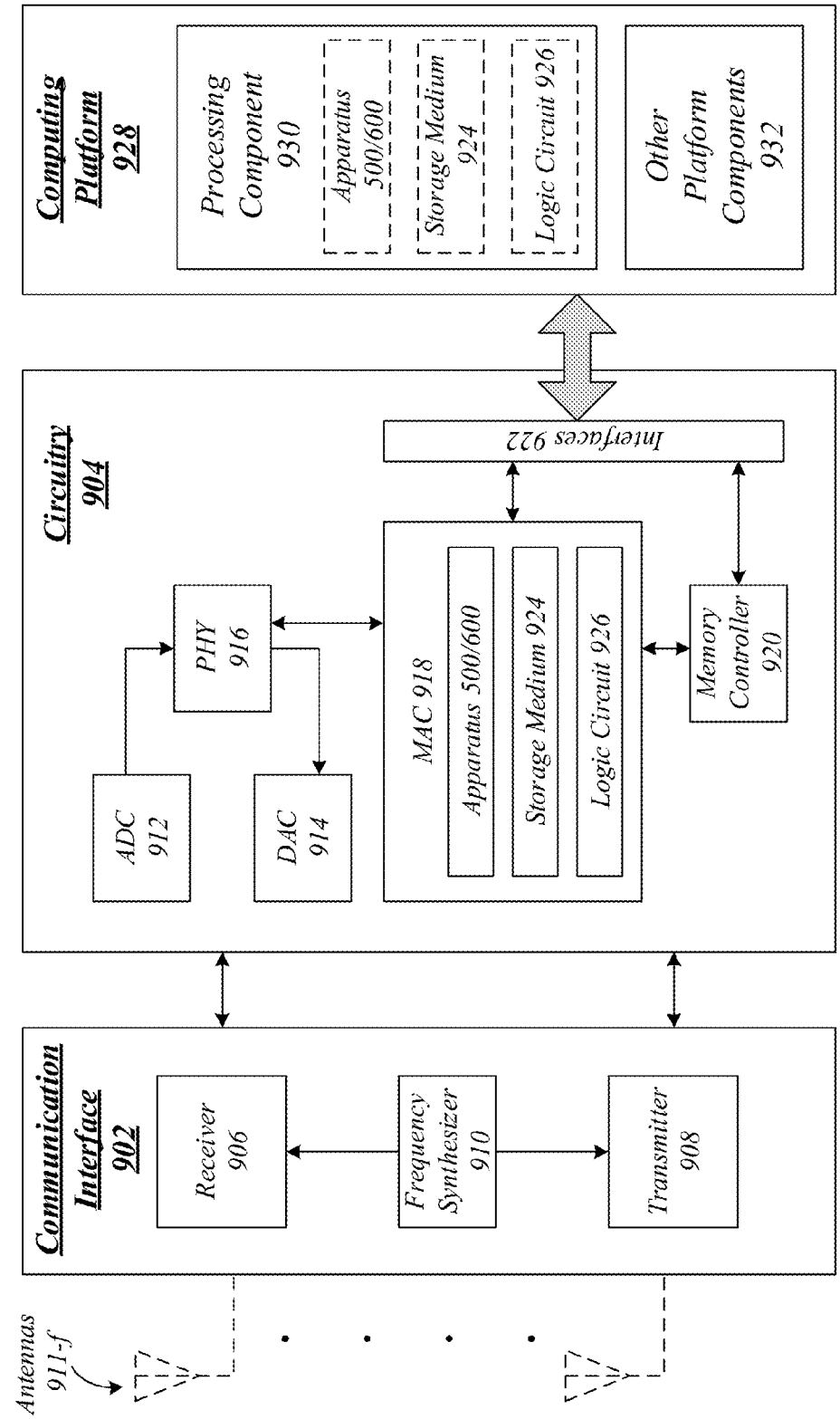
FIG. 9 illustrates an embodiment a device.

FIG. 9 illustrates an embodiment of a communications device 900 that may operate within unlicensed spectrum and may implement one or more of apparatus 500 and/or system 514 of FIG. 5, apparatus 600 and/or system 616 of FIG. 6, logic flow 700 of FIG. 7, and/or logic flow 800 of FIG. 8. As shown in FIG. 9, device 900 may include a communications interface 902, baseband circuitry 904, and a computing platform 928, although the embodiments are not limited to this configuration.

As shown in FIG. 9, the communications device 900 can include a storage medium 924. The storage medium 924 may comprise any non-transitory computer-readable storage medium or machine-readable storage medium, such as an optical, magnetic or semiconductor storage medium. In various embodiments, the storage medium 924 may comprise an article of manufacture. In some embodiments, the storage medium 924 may store computer-executable instructions, such as computer-executable instructions to implement one or more of the operations described in relation to one or more of apparatus 500 and/or system 514 of FIG. 5, apparatus 600 and/or system 616 of FIG. 6, logic flow 700 of FIG. 7, and/or logic flow 800 of FIG. 8, for example. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

In various embodiments, device 900 may comprise a logic circuit 926. The logic circuit 926 may include physical circuits to perform operations described for one or more of apparatus 500 and/or system 514 of FIG. 5, apparatus 600 and/or system 616 of FIG. 6, logic flow 700 of FIG. 7, and/or logic flow 800 of FIG. 8, for example.

The device 900 may implement some or all of the aforementioned structure and/or operations in a single computing entity, such as entirely within a single device. Alternatively, the device 900 may distribute portions of the aforementioned structure and/or operations across multiple computing entities using a distributed system architecture, such as a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, communication interface 902 may include a component or combination of components adapted for transmitting and receiving communication messages over one or more wired or wireless interfaces according to one or more communication standard protocols. As an example, the communications interface 902 may be a radio interface and may be include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. The communications interface 902 may include, for example, a receiver 906 and a transmitter 908. As a radio interface, the communications interface 902 may also include a frequency synthesizer 910. As a radio interface, the communications interface 902 may include bias controls, a crystal oscillator and/or one or more antennas 911-f (shown in phantom). In another embodiment as a radio interface, the communications interface 902 may use external voltage-controlled oscillators (VCOs), surface acoustic wave filters, intermediate frequency (IF) filters and/or RF filters, as desired. Due to the variety of potential RF interface designs an expansive description thereof is omitted.

Circuitry 904 may communicate with communications interface 902 to process, receive and/or transmit signals. The circuitry 904 may include an analog-to-digital converter (ADC) 912 and a digital-to-analog converter (DAC) 914. In some embodiments for the communications interface 902 implemented as a radio interface, the ADC 912 can be used for down converting received signals and the DAC 914 can be used for up converting signals for transmission. The circuitry 904 may include a baseband or physical layer (PHY) processing circuit 916 for PHY link layer processing of respective receive/transmit signals. The circuitry 904 may include, for example, a medium access control (MAC) processing circuit 918 for MAC/data link layer processing. The circuitry 904 may include a memory controller 920 for communicating with MAC processing circuit 918 and/or a computing platform 928, for example, via one or more interfaces 922.

In some embodiments, PHY processing circuit 916 may include a frame construction and/or detection module, in combination with additional circuitry such as a buffer memory, to construct and/or deconstruct communication frames. Alternatively or in addition, MAC processing circuit 918 may share processing for certain of these functions or perform these processes independent of PHY processing circuit 916. In some embodiments, MAC and PHY processing may be integrated into a single circuit.

The computing platform 928 may provide computing functionality for the device 900. As shown, the computing platform 928 may include a processing component 930. In addition to, or alternatively of the circuitry 904, the device 900 may execute processing operations or logic for one or more of apparatus 500 and/or system 514 of FIG. 5, apparatus 600 and/or system 616 of FIG. 6, logic flow 700 of FIG. 7, and/or logic flow 800 of FIG. 8, storage medium 924, and logic circuit 926 using the processing component 930.

The processing component 930 (and/or PHY 916 and/or MAC 918) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 928 may further include other platform components 932. Other platform components 932 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, eNB, PDN-GW, TWAG, eDPG, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 911-f) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
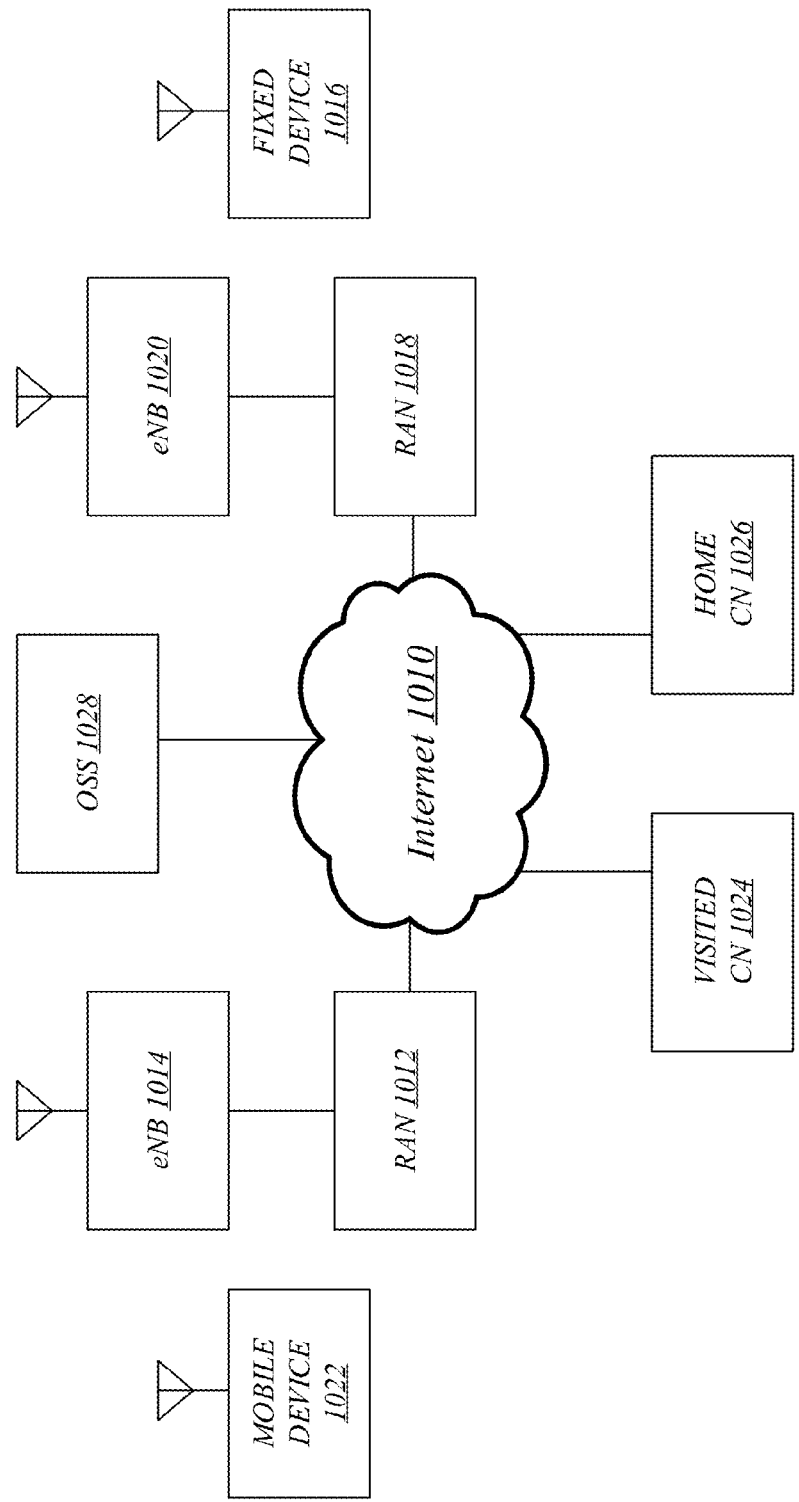
FIG. 10 illustrates an embodiment of a wireless network.

FIG. 10 illustrates an embodiment of a broadband wireless access system 1000. As shown in FIG. 10, broadband wireless access system 1000 may be an internet protocol (IP) type network comprising an internet 1010 type network or the like that is capable of supporting mobile wireless access and/or fixed wireless access to internet 1010. In one or more embodiments, broadband wireless access system 1000 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.13 Standards, and the scope of the claimed subject matter is not limited in these respects.

In the exemplary broadband wireless access system 1000, radio access networks (RANs) 1012 and 1018 are capable of coupling with evolved node Bs (eNBs) 1014 and 1020, respectively, to provide wireless communication between one or more fixed devices 1016 and internet 1010 and/or between or one or more mobile devices 1022 and Internet 1010. One example of a fixed device 1016 and a mobile device 1022 is device 900 of FIG. 9, with the fixed device 1016 comprising a stationary version of device 900 and the mobile device 1022 comprising a mobile version of device 900. RANs 1012 and 1018 may implement profiles that are capable of defining the mapping of network functions to one or more physical entities on broadband wireless access system 1000. eNBs 1014 and 1020 may comprise radio equipment to provide RF communication with fixed device 1016 and/or mobile device 1022, such as described with reference to device 900, and may comprise, for example, the PHY and MAC layer equipment in compliance with a 3GPP LTE Specification or an IEEE 802.13 Standard. eNBs 1014 and 1020 may further comprise an IP backplane to couple to Internet 1010 via RANs 1012 and 1018, respectively, although the scope of the claimed subject matter is not limited in these respects.

Broadband wireless access system 1000 may further comprise a visited core network (CN) 1024 and/or a home CN 1026, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1024 and/or home CN 1026, and the scope of the claimed subject matter is not limited in these respects. Visited CN 1024 may be referred to as a visited CN in the case where visited CN 1024 is not part of the regular service provider of fixed device 1016 or mobile device 1022, for example where fixed device 1016 or mobile device 1022 is roaming away from its respective home CN 1026, or where broadband wireless access system 1000 is part of the regular service provider of fixed device 1016 or mobile device 1022 but where broadband wireless access system 1000 may be in another location or state that is not the main or home location of fixed device 1016 or mobile device 1022. The embodiments are not limited in this context.

Fixed device 1016 may be located anywhere within range of one or both of eNBs 1014 and 1020, such as in or near a home or business to provide home or business customer broadband access to Internet 1010 via eNBs 1014 and 1020 and RANs 1012 and 1018, respectively, and home CN 1026. It is worthy of note that although fixed device 1016 is generally disposed in a stationary location, it may be moved to different locations as needed. Mobile device 1022 may be utilized at one or more locations if mobile device 1022 is within range of one or both of eNBs 1014 and 1020, for example. In accordance with one or more embodiments, operation support system (OSS) 1028 may be part of broadband wireless access system 1000 to provide management functions for broadband wireless access system 1000 and to provide interfaces between functional entities of broadband wireless access system 1000. Broadband wireless access system 1000 of FIG. 10 is merely one type of wireless network showing a certain number of the components of broadband wireless access system 1000, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following set of examples pertain to further embodiments:

Example 1 is an apparatus comprising a radio frequency (RF) transceiver and logic, at least a portion of which is in hardware, the logic to identify a candidate window for opportunistic transmission of one or more reference signals over a carrier, determine whether the carrier is available during the candidate window, and in response to a determination that the carrier is available during the candidate window, cause the RF transceiver to transmit the one or more reference signals over the carrier during the candidate window. Example 2 is an extension of Example 1, the carrier to comprise an unlicensed carrier. Example 3 is an extension of Example 1, the candidate window to correspond to a discovery measurement timing configuration (DMTC) occasion. Example 4 is an extension of Example 1, the candidate window to correspond to a discovery signal (DRS) occasion. Example 5 is an extension of Example 1, the candidate window to correspond to both a discovery measurement timing configuration (DMTC) and a discovery signal (DRS) occasion. Example 6 is an extension of Example 1, the logic to identify the candidate window based on a candidate window periodicity. Example 7 is an extension of Example 6, the candidate window periodicity set to 40 milliseconds (ms). Example 8 is an extension of Example 6, the candidate window periodicity set to 80 milliseconds (ms). Example 9 is an extension of Example 6, the candidate window periodicity set to 160 milliseconds (ms). Example 10 is an extension of Example 1, the logic to identify the candidate window based on a candidate window duration. Example 11 is an extension of Example 10, the candidate window duration set to 6 milliseconds (ms). Example 12 is an extension of Example 1, the candidate window to comprise one or more subframes. Example 13 is an extension of Example 12, the candidate window to comprise five subframes. Example 14 is an extension of Example 12, the one or more reference signals transmitted across the one or more subframes. Example 15 is an extension of Example 12, the one or more reference signals transmitted in a single subframe. Example 16 is an extension of Example 12, the one or more reference signals transmitted relative to one another across the one or more subframes. Example 17 is an extension of Example 12, the one or more reference signals transmitted based on a subframe offset. Example 18 is an extension of Example 1, the one or more reference signals to comprise a cell specific reference signal (CRS). Example 19 is an extension of Example 1, the one or more reference signals to comprise a positioning reference signal (PRS). Example 20 is an extension of Example 1, the one or more reference signals to comprise a channel state information reference signal (CSI-RS). Example 21 is an extension of Example 1, the one or more reference signals to comprise a discovery signal (DRS). Example 22 is an extension of Example 21, the candidate window to comprise one or more subframes, the DRS transmitted within any of the one or more subframes. Example 23 is an extension of Example 21, the candidate window to comprise one or more subframes, the logic to cause the RF transceiver to not transmit the DRS during a predetermined subframe within the candidate window in response to a determination that the carrier is unavailable during the predetermined subframe. Example 24 is an extension of Example 1, the one or more reference signals to comprise a demodulation reference signal. Example 25 is an extension of Example 1, the one or more reference signals to comprise a primary synchronization signal (PSS). Example 26 is an extension of Example 1, the one or more reference signals to comprise a secondary synchronization signal (SSS). Example 27 is an extension of Example 1, the logic to direct the RF transceiver to transmit the one or more reference signals within the candidate window after a delay if the carrier is unavailable. Example 28 is an extension of Example 27, the delay to comprise a random amount of time. Example 29 is an extension of Example 1, the apparatus to operate according to 3GPP License-Assisted Access (LAA). Example 30 is an extension of Example 1, the apparatus to operate according to 3GPP Long Term Evolution LTE-Unlicensed (LTE-U). Example 31 is an extension of Example 1, the logic to direct the RF transceiver to transmit the one or more reference signals based on a co-existence communications protocol. Example 32 is an extension of Example 31, the co-existence communications protocol to comprise a listen before talk (LBT) protocol. Example 33 is an extension of Example 31, the co-existence communications protocol to comprise a carrier sense multiple access/collision avoidance (CSMA/CA) protocol. Example 34 is an extension of Example 1, the logic to direct the RF transceiver to transmit information regarding identification of the candidate window prior to transmitting the one or more reference signals. Example 35 is an evolved node B (eNB) comprising any of the Examples 1 through 34 and at least one RF antenna. Example 36 is system comprising any of the Examples 1 through 34 and at least one RF antenna.

Example 37 is a wireless communication method comprising determining, by processing circuitry at an evolved node B (eNB), a window for opportunistically transmitting one or more reference signals, generating the one or more reference signals, determining whether a frequency spectrum is available during the window, and transmitting the one or more reference signals within the window over the frequency spectrum in response to a determination that the frequency spectrum is available. Example 38 is an extension of Example 37, the frequency spectrum to comprise an unlicensed frequency spectrum. Example 39 is an extension of Example 37, the window to correspond to a discovery measurement timing configuration (DMTC) occasion. Example 40 is an extension of Example 37, the window to correspond to a discovery signal (DRS) occasion. Example 41 is an extension of Example 37, the window to correspond to both a discovery measurement timing configuration (DMTC) and a discovery signal (DRS) occasion. Example 42 is an extension of Example 37, the window to comprise a window periodicity. Example 43 is an extension of Example 42, the window periodicity set to 40 milliseconds (ms). Example 44 is an extension of Example 42, the window periodicity set to 80 milliseconds (ms). Example 45 is an extension of Example 42, the window periodicity set to 160 milliseconds (ms). Example 46 is an extension of Example 37, the window to comprise a window duration. Example 47 is an extension of Example 46, the window duration set to 6 milliseconds (ms). Example 48 is an extension of Example 37, the window to comprise one or more subframes. Example 49 is an extension of Example 48, the window to comprise five subframes. Example 50 is an extension of Example 48, comprising transmitting the one or more reference signals across the one or more subframes. Example 51 is an extension of Example 48, comprising transmitting the one or more reference signals in a single subframe. Example 52 is an extension of Example 48, comprising transmitting the one or more reference signals relative to one another across the one or more subframes. Example 53 is an extension of Example 48, comprising transmitting the one or more reference signals based on a subframe offset. Example 54 is an extension of Example 37, the one or more reference signals to comprise a cell specific reference signal (CRS). Example 55 is an extension of Example 37, the one or more reference signals to comprise a positioning reference signal (PRS). Example 56 is an extension of Example 37, the one or more reference signals to comprise a channel state information reference signal (CSI-RS). Example 57 is an extension of Example 37, the one or more reference signals to comprise a discovery signal (DRS). Example 58 is an extension of Example 57, the window to comprise one or more subframes and transmitting the DRS within any of the one or more subframes. Example 59 is an extension of Example 37, the window to comprise one or more subframes and waiting to transmit the DRS after a predetermined subframe within the window in response to a determination that the frequency spectrum is unavailable during the predetermined subframe. Example 60 is an extension of Example 37, the one or more reference signals to comprise a demodulation reference signal. Example 61 is an extension of Example 37, the one or more reference signals to comprise a primary synchronization signal (PSS). Example 62 is an extension of Example 37, the one or more reference signals to comprise a secondary synchronization signal (SSS). Example 63 is an extension of Example 37, comprising transmitting the one or more reference signals within the window after a delay if the frequency spectrum is unavailable. Example 64 is an extension of Example 63, the delay to comprise a random amount of time. Example 65 is an extension of Example 37, comprising determining an operating environment. Example 66 is an extension of Example 65, comprising determining the operating environment to comprise a 3GPP License-Assisted Access (LAA) operating environment. Example 67 is an extension of Example 65, comprising determining the operating environment to comprise a 3GPP Long Term Evolution LTE-Unlicensed (LTE-U) operating environment. Example 68 is an extension of Example 65, comprising determining the operating environment to comprise one or more different radio access technologies (RATs). Example 69 is an extension of Example 65, comprising determining the operating environment to comprise operation according to a co-existence communications protocol. Example 70 is an extension of Example 69, the co-existence communications protocol to comprise a listen before talk (LBT) protocol. Example 71 is an extension of Example 69, the co-existence communications protocol to comprise a carrier sense multiple access/collision avoidance (CSMA/CA) protocol. Example 72 is an extension of Example 37, comprising transmitting information regarding configuration of the window prior to transmitting the one or more reference signals. Example 73 is at least one non-transitory computer-readable storage medium comprising a set of instructions that, in response to being executed on a computing device, cause the computing device to perform a wireless communication method according to any of Examples 37 to 72. Example 74 is an apparatus, comprising means for performing a wireless communication method according to any of Examples 37 to 72.

Example 75 is at least one non-transitory computer-readable storage medium comprising a set of wireless communication instructions that, in response to being executed at an evolved node B (eNB), cause the eNB to determine a search window for transmission of one or more reference signals, generate the one or more reference signals, determine whether a frequency band is free during the search window, and transmit the one or more reference signals adaptively within the search window in the frequency band in response to a determination that the frequency band is free. Example 76 is an extension of Example 75 comprising wireless communication instructions that, in response to being executed at the eNB, cause the eNB to transmit the one or more reference signals in an unlicensed frequency band. Example 77 is an extension of Example 75, comprising wireless communication instructions that, in response to being executed at the eNB, cause the eNB to determine the search window to correspond to a discovery measurement timing configuration (DMTC) occasion. Example 78 is an extension of Example 75, comprising wireless communication instructions that, in response to being executed at the eNB, cause the eNB to determine the search window to correspond to a discovery signal (DRS) occasion. Example 79 is an extension of Example 75, comprising wireless communication instructions that, in response to being executed at the eNB, cause the eNB to determine the search window to correspond to both a discovery measurement timing configuration (DMTC) and a discovery signal (DRS) occasion. Example 80 is an extension of Example 75, comprising wireless communication instructions that, in response to being executed at the eNB, cause the eNB to determine the search window to comprise a search window periodicity. Example 81 is an extension of Example 80, comprising wireless communication instructions that, in response to being executed at the eNB, cause the eNB to set the search window periodicity to 40 milliseconds (ms). Example 82 is an extension of Example 80, comprising wireless communication instructions that, in response to being executed at the eNB, cause the eNB to set the search window periodicity to 80 milliseconds (ms). Example 83 is an extension of Example 80, comprising wireless communication instructions that, in response to being executed at the eNB, cause the eNB to set the search window periodicity to 160 milliseconds (ms). Example 84 is an extension of Example 75, comprising wireless communication instructions that, in response to being executed at the eNB, cause the eNB to determine the search window to comprise a search window duration. Example 85 is an extension of Example 84, comprising wireless communication instructions that, in response to being executed at the eNB, cause the eNB to set the search window duration to 6 milliseconds (ms). Example 86 is an extension of Example 75, comprising wireless communication instructions that, in response to being executed at the eNB, cause the eNB to determine the search window to comprise one or more subframes. Example 87 is an extension of Example 86, comprising wireless communication instructions that, in response to being executed at the eNB, cause the eNB to determine the search window to comprise five subframes. Example 88 is an extension of Example 86, comprising wireless communication instructions that, in response to being executed at the eNB, cause the eNB to transmit the one or more reference signals across the one or more subframes. Example 89 is an extension of Example 86, comprising wireless communication instructions that, in response to being executed at the eNB, cause the eNB to transmit the one or more reference signals in a single subframe. Example 90 is an extension of Example 86, comprising wireless communication instructions that, in response to being executed at the eNB, cause the eNB to transmit the one or more reference signals relative to one another across the one or more subframes. Example 91 is an extension of Example 86, comprising wireless communication instructions that, in response to being executed at the eNB, cause the eNB to transmit the one or more reference signals based on a subframe offset. Example 92 is an extension of Example 75, comprising wireless communication instructions that, in response to being executed at the eNB, cause the eNB to generate a cell specific reference signal (CRS). Example 93 is an extension of Example 75, comprising wireless communication instructions that, in response to being executed at the eNB, cause the eNB to generate a positioning reference signal (PRS). Example 94 is an extension of Example 75, comprising wireless communication instructions that, in response to being executed at the eNB, cause the eNB to generate a channel state information reference signal (CSI-RS). Example 95 is an extension of Example 75, comprising wireless communication instructions that, in response to being executed at the eNB, cause the eNB to generate a discovery signal (DRS). Example 96 is an extension of Example 95, comprising wireless communication instructions that, in response to being executed at the eNB, cause the eNB to determine the search window to comprise one or more subframes and to transmit the DRS within any of the one or more subframes. Example 97 is an extension of Example 95, comprising wireless communication instructions that, in response to being executed at the eNB, cause the eNB to determine the search window to comprise one or more subframes and to wait to transmit the DRS after a predetermined subframe within the search window in response to a determination that the frequency band is unavailable during the predetermined subframe. Example 98 is an extension of Example 75, comprising wireless communication instructions that, in response to being executed at the eNB, cause the eNB to generate a demodulation reference signal. Example 99 is an extension of Example 75, comprising wireless communication instructions that, in response to being executed at the eNB, cause the eNB to generate a primary synchronization signal (PSS). Example 100 is an extension of Example 75, comprising wireless communication instructions that, in response to being executed at the eNB, cause the eNB to generate a secondary synchronization signal (SSS). Example 101 is an extension of Example 75, comprising wireless communication instructions that, in response to being executed at the eNB, cause the eNB to transmit the one or more reference signals within the search window after a delay if the frequency band is unavailable. Example 102 is an extension of Example 101, comprising wireless communication instructions that, in response to being executed at the eNB, cause the eNB to determine a random amount of time to correspond to the delay. Example 103 is an extension of Example 75, comprising wireless communication instructions that, in response to being executed at the eNB, cause the eNB to determine an operating environment. Example 104 is an extension of Example 103, comprising wireless communication instructions that, in response to being executed at the eNB, cause the eNB to determine the operating environment to comprise a 3GPP License-Assisted Access (LAA) operating environment. Example 105 is an extension of Example 103, comprising wireless communication instructions that, in response to being executed at the eNB, cause the eNB to determine the operating environment to comprise a 3GPP Long Term Evolution LTE-Unlicensed (LTE-U) operating environment. Example 106 is an extension of Example 103, comprising wireless communication instructions that, in response to being executed at the eNB, cause the eNB to determine the operating environment to comprise one or more different radio access technologies (RATs). Example 107 is an extension of Example 103, comprising wireless communication instructions that, in response to being executed at the eNB, cause the eNB to determine the operating environment to comprise operation according to a co-existence communications protocol. Example 108 is an extension of Example 107, comprising wireless communication instructions that, in response to being executed at the eNB, cause the eNB to determine the co-existence communications protocol to comprise a listen before talk (LBT) protocol. Example 109 is an extension of Example 107, comprising wireless communication instructions that, in response to being executed at the eNB, cause the eNB to determine the co-existence communications protocol to comprise a carrier sense multiple access/collision avoidance (CSMA/CA) protocol. Example 110 is an extension of Example 75, comprising wireless communication instructions that, in response to being executed at the eNB, cause the eNB to transmit information regarding configuration of the window prior to transmitting the one or more reference signals. Example 111 is an extension of Example 75, comprising wireless communication instructions that, in response to being executed at the eNB, cause the eNB to transmit the one or more reference signals based on a listen before talk (LBT) protocol.

Example 112 is an apparatus comprising logic, at least a portion of which is in hardware, the logic to determine a window for receiving one or more reference signals and to determine a serving cell of a user equipment (UE) is configured to perform opportunistic transmission of the one or more reference signals within the window and a radio frequency (RF) transceiver to monitor a carrier for the one or more reference signals during the window. Example 113 is an extension of Example 112, the carrier to comprise an unlicensed carrier. Example 114 is an extension of Example 112, the logic to perform a detection operation on transmissions received on the carrier within the window to recover the one or more reference signals. Example 115 is an extension of Example 114, the logic to recover the one or more reference signals by comparing the transmissions received to one or more known fixed patterns representative of the one or more reference signals. Example 116 is an extension of Example 112, the logic to determine a configuration of the window prior to the RF transceiver receiving the one or more reference signals. Example 117 is an extension of Example 116, the logic to determine the configuration of the window based on information received by the RF transceiver. Example 118 is an extension of Example 112, the window to correspond to a discovery measurement timing configuration (DMTC) occasion. Example 119 is an extension of Example 112, the window to correspond to a discovery signal (DRS) occasion. Example 120 is an extension of Example 112, the window to correspond to both to a discovery measurement timing configuration (DMTC) occasion and a discovery signal (DRS) occasion. Example 121 is an extension of Example 112, the window to comprise a window periodicity. Example 122 is an extension of Example 121, the window periodicity set to 40 milliseconds (ms). Example 123 is an extension of Example 121, the window periodicity set to 80 milliseconds (ms). Example 124 is an extension of Example 121, the window periodicity set to 160 milliseconds (ms). Example 125 is an extension of Example 112, the window to comprise a window duration. Example 126 is an extension of Example 125, the window duration set to 6 milliseconds (ms). Example 127 is an extension of Example 112, the the window comprises one or more subframes. Example 128 is an extension of Example 127, the window to comprise five subframes. Example 129 is an extension of Example 127, the one or more reference signals received across the one or more subframes. Example 130 is an extension of Example 127, the one or more reference signals received in a single subframe. Example 131 is an extension of Example 127, the one or more reference signals received relative to one another across the one or more subframes. Example 132 is an extension of Example 127, the one or more reference signals received based on a subframe offset. Example 133 is an extension of Example 117, the one or more reference signals to comprise a cell specific reference signal (CRS). Example 134 is an extension of Example 117, the one or more reference signals to comprise a positioning reference signal (PRS). Example 135 is an extension of Example 117, the one or more reference signals to comprise a channel state information reference signal (CSI-RS). Example 136 is an extension of Example 117, the one or more reference signals to comprise a discovery signal (DRS). Example 137 is an extension of Example 117, the one or more reference signals to comprise a demodulation reference signal. Example 138 is an extension of Example 117, the one or more reference signals to comprise a primary synchronization signal (PSS). Example 139 is an extension of Example 117, the one or more reference signals to comprise a secondary synchronization signal (SSS). Example 140 is an extension of Example 117, the logic to determine an operating environment. Example 141 is an extension of Example 140, the logic to determine the operating environment to comprise a 3GPP License-Assisted Access (LAA) operating environment. Example 142 is an extension of Example 140, the logic to determine the operating environment to comprise a 3GPP Long Term Evolution LTE-Unlicensed (LTE-U) operating environment. Example 143 is an extension of Example 140, the logic to determine the operating environment to comprise one or more different radio access technologies (RATs). Example 144 is an extension of Example 117, the logic to perform a reporting operation based on the one or more received reference signals. Example 145 is an extension of Example 144, the logic to perform a DRS-based reference signal received power (RSRP) reporting operation. Example 146 is an extension of Example 144, the logic to perform a reference signal received quality (RSRQ) reporting operation. Example 147 is an extension of Example 144, the logic to perform an associated physical cell identification (Physical Cell ID) reporting operation. Example 148 is an extension of Example 144, the logic to perform a transmission point identification (Transmission Point ID) reporting operation. Example 149 is a system comprising an apparatus according to any of Examples 117 to 148, one or more radio frequency (RF) antennas, and a display.

Example 150 is a wireless communication method comprising determining, by processing circuitry at a user equipment (UE), a search window for receiving one or more reference signals and monitoring a frequency band to receive the one or more reference signals opportunistically within the search window. Example 151 is an extension of Example 150, the frequency band to comprise an unlicensed frequency band. Example 152 is an extension of Example 151, the unlicensed frequency band to correspond to a serving cell of the UE. Example 153 is an extension of Example 150, comprising performing a detection operation on signals received on the frequency band within the search window to recover the one or more reference signals. Example 154 is an extension of Example 153, comprising comparing the signals received to one or more known fixed patterns representative of the one or more reference signals. Example 155 is an extension of Example 150, comprising determining the search window corresponds to a discovery measurement timing configuration (DMTC) occasion. Example 156 is an extension of Example 150, comprising determining the search window corresponds to a discovery signal (DRS) occasion. Example 157 is an extension of Example 150, comprising determining the search window corresponds to both a discovery measurement timing configuration (DMTC) occasion and a discovery signal (DRS) occasion. Example 158 is an extension of Example 150, comprising determining the search window to comprise a search window periodicity. Example 159 is an extension of Example 150, comprising determining the search window to comprise a search window duration. Example 160 is an extension of Example 150, comprising determining the search window to comprise one or more subframes. Example 161 is an extension of Example 160, comprising determining the search window to comprise five subframes. Example 162 is an extension of Example 160, comprising determining an expected position of each of the one or more reference signals across the one or more subframes. Example 163 is an extension of Example 162, comprising determining the expected positon of each of the one or more reference signals to comprise a single subframe. Example 164 is an extension of Example 150, comprising receiving a cell specific reference signal (CRS). Example 165 is an extension of Example 150, comprising receiving a positioning reference signal (PRS). Example 166 is an extension of Example 150, comprising receiving a channel state information reference signal (CSI-RS). Example 167 is an extension of Example 150, comprising receiving a discovery signal (DRS). Example 168 is an extension of Example 150, comprising receiving a demodulation reference signal. Example 169 is an extension of Example 150, comprising receiving a primary synchronization signal (PSS). Example 170 is an extension of Example 150, comprising receiving a secondary synchronization signal (SSS). Example 171 is an extension of Example 150, comprising determining an operating environment. Example 172 is an extension of Example 171, comprising determining the operating environment to comprise a 3GPP License-Assisted Access (LAA) operating environment. Example 173 is an extension of Example 171, comprising determining the operating environment to comprise a 3GPP Long Term Evolution LTE-Unlicensed (LTE-U) operating environment. Example 174 is an extension of Example 150, comprising determining a configuration of the window prior to receiving the one or more reference signals. Example 175 is an extension of Example 174, comprising determining the configuration of the window based on information received prior to receiving the one or more reference signals. Example 176 is an extension of Example 150, comprising performing a reporting operation based on the one or more received reference signals. Example 177 is an extension of Example 176, comprising performing a DRS-based reference signal received power (RSRP) reporting operation. Example 178 is an extension of Example 176, comprising performing a reference signal received quality (RSRQ) reporting operation. Example 179 is an extension of Example 176, comprising performing an associated physical cell identification (Physical Cell ID) reporting operation. Example 180 is an extension of Example 176, comprising performing a transmission point identification (Transmission Point ID) operation. Example 181 is at least one non-transitory computer-readable storage medium comprising a set of instructions that, in response to being executed on a computing device, cause the computing device to perform a wireless communication method according to any of Examples 150 to 180. Example 182 is an apparatus, comprising means for performing a wireless communication method according to any of Examples 150 to 180.

Example 183 is at least one non-transitory computer-readable storage medium comprising a set of wireless communication instructions that, in response to being executed at a user equipment (UE) cause the UE to determine a candidate window for receiving one or more reference signals and monitor a carrier to receive the one or more reference signals adaptively over the carrier within the search window. Example 184 is an extension of Example 183, comprising wireless communication instructions that, in response to being executed at the UE, cause the UE to monitor an unlicensed carrier. Example 185 is an extension of Example 183, comprising wireless communication instructions that, in response to being executed at the UE, cause the UE to perform a detection operation on signals received on the carrier within the candidate window to recover the one or more reference signals. Example 186 is an extension of Example 185, comprising wireless communication instructions that, in response to being executed at the UE, cause the UE to compare the signals received to one or more known fixed patterns representative of the one or more reference signals. Example 187 is an extension of Example 183, comprising wireless communication instructions that, in response to being executed at the UE, cause the UE to determine the candidate window corresponds to a discovery measurement timing configuration (DMTC) occasion. Example 188 is an extension of Example 183, comprising wireless communication instructions that, in response to being executed at the UE, cause the UE to determine the candidate window corresponds to a discovery signal (DRS) occasion. Example 189 is an extension of Example 183, comprising wireless communication instructions that, in response to being executed at the UE, cause the UE to determine the candidate window corresponds to both a discovery measurement timing configuration (DMTC) occasion and a discovery signal (DRS) occasion. Example 190 is an extension of Example 183, comprising wireless communication instructions that, in response to being executed at the UE, cause the UE to determine the candidate window comprises a search window periodicity. Example 191 is an extension of Example 183, comprising wireless communication instructions that, in response to being executed at the UE, cause the UE to determine the candidate window comprises a search window duration. Example 192 is an extension of Example 183, comprising wireless communication instructions that, in response to being executed at the UE, cause the UE to determine the candidate window comprises one or more subframes. Example 193 is an extension of Example 192, comprising wireless communication instructions that, in response to being executed at the UE, cause the UE to determine the candidate window comprises five subframes. Example 194 is an extension of Example 192, comprising wireless communication instructions that, in response to being executed at the UE, cause the UE to determine an expected position of each of the one or more reference signals across the one or more subframes. Example 195 is an extension of Example 194, comprising wireless communication instructions that, in response to being executed at the UE, cause the UE to determine the expected positon of each of the one or more reference signals to comprise a single subframe. Example 196 is an extension of Example 183, comprising wireless communication instructions that, in response to being executed at the UE, cause the UE to receive a cell specific reference signal (CRS). Example 197 is an extension of Example 183, comprising wireless communication instructions that, in response to being executed at the UE, cause the UE to receive a positioning reference signal (PRS). Example 198 is an extension of Example 183, comprising wireless communication instructions that, in response to being executed at the UE, cause the UE to receive a channel state information reference signal (CSI-RS). Example 199 is an extension of Example 183, comprising wireless communication instructions that, in response to being executed at the UE, cause the UE to receive a discovery signal (DRS). Example 200 is an extension of Example 183, comprising wireless communication instructions that, in response to being executed at the UE, cause the UE to receive a demodulation reference signal. Example 201 is an extension of Example 183, comprising wireless communication instructions that, in response to being executed at the UE, cause the UE to receive a primary synchronization signal (PSS). Example 202 is an extension of Example 183, comprising wireless communication instructions that, in response to being executed at the UE, cause the UE to receive a secondary synchronization signal (SSS). Example 203 is an extension of Example 183, comprising wireless communication instructions that, in response to being executed at the UE, cause the UE to determine an operating environment. Example 204 is an extension of Example 203, comprising wireless communication instructions that, in response to being executed at the UE, cause the UE to determine the operating environment to comprise a 3GPP License-Assisted Access (LAA) operating environment. Example 205 is an extension of Example 203, comprising wireless communication instructions that, in response to being executed at the UE, cause the UE to determine the operating environment to comprise a 3GPP Long Term Evolution LTE-Unlicensed (LTE-U) operating environment. Example 206 is an extension of Example 183, comprising wireless communication instructions that, in response to being executed at the UE, cause the UE to determine a configuration of the window prior to receiving the one or more reference signals. Example 207 is an extension of Example 206, comprising wireless communication instructions that, in response to being executed at the UE, cause the UE to determine the configuration of the window based on information received prior to receiving the one or more reference signals. Example 208 is an extension of Example 183, comprising wireless communication instructions that, in response to being executed at the UE, cause the UE to perform a reporting operation based on the one or more received reference signals. Example 209 is an extension of Example 208, comprising wireless communication instructions that, in response to being executed at the UE, cause the UE to perform a DRS-based reference signal received power (RSRP) reporting operation. Example 210 is an extension of Example 208, comprising wireless communication instructions that, in response to being executed at the UE, cause the UE to perform a reference signal received quality (RSRQ) reporting operation. Example 211 is an extension of Example 208, comprising wireless communication instructions that, in response to being executed at the UE, cause the UE to perform an associated physical cell identification (Physical Cell ID) reporting operation. Example 212 is an extension of Example 208, comprising wireless communication instructions that, in response to being executed at the UE, cause the UE to perform a transmission point identification (Transmission Point ID) operation.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An evolved node B (eNB), comprising:
a radio frequency (RF) transceiver; and
logic, at least a portion of which is in hardware, the logic to:
  identify a candidate window for opportunistic transmission of one or more reference signals over an unlicensed carrier, the candidate window comprising multiple subframes;
  transmit configuration information regarding positioning of the one or more reference signals in one or more selected subframes of the candidate window;
  determine whether the carrier is available during the selected subframes of the candidate window, and
  in response to a determination that the carrier is not available during the selected subframes of the candidate window, cause the RF transceiver to transmit the one or more reference signals over the carrier during one or more subframes of the candidate window different from the selected subframes.

2. The eNB of claim 1, the candidate window to correspond to a discovery measurement timing configuration (DMTC) occasion.

3. The eNB of claim 1, the candidate window to correspond to a discovery signal (DRS) occasion.

4. The eNB of claim 1, the candidate window to correspond to both a discovery measurement timing configuration (DMTC) and a discovery signal (DRS) occasion.

5. The eNB of claim 1, the logic to identify the candidate window based on a candidate window periodicity.

6. The eNB of claim 1, the logic to identify the candidate window based on a candidate window duration.

7. The eNB of claim 1, the one or more reference signals to comprise a discovery signal (DRS).

8. The eNB of claim 1, the logic to direct the RF transceiver to transmit the one or more reference signals within the candidate window after a delay if the carrier is unavailable.

9. The eNB of claim 1, the logic to direct the RF transceiver to transmit the one or more reference signals based on a co-existence communications protocol.

10. The eNB of claim 9, the co-existence communications protocol to comprise a listen before talk (LBT) protocol.

11. At least one non-transitory computer-readable storage medium comprising a set of wireless communication instructions that, in response to being executed at an evolved node B (eNB) cause the eNB to:
determine a search window for transmission of one or more reference signals over an unlicensed frequency band, the search window comprising multiple subframes;
generate the one or more reference signals;
transmit configuration information regarding positioning of the one or more reference signals in one or more selected subframes of the search window;
determine whether a frequency band is free during the selected subframes of the search window; and
in response to a determination that the frequency band is not free during the selected subframes of the search window, transmit the one or more reference signals in the frequency band in one or more subframes of the search window different from the selected subframes.

12. The at least one non-transitory computer-readable storage medium of claim 11, comprising wireless communication instructions that, in response to being executed at the eNB, cause the eNB to determine the search window to correspond to at least one of a discovery measurement timing configuration (DMTC) occasion and a discovery signal (DRS) occasion.

13. The at least one non-transitory computer-readable storage medium of claim 11, comprising wireless communication instructions that, in response to being executed at the eNB, cause the eNB to determine the search window to comprise at least one of a search window periodicity and a search window duration.

14. The at least one non-transitory computer-readable storage medium of claim 11, comprising wireless communication instructions that, in response to being executed at the eNB, cause the eNB to generate a discovery signal (DRS).

15. The at least one non-transitory computer-readable storage medium of claim 11, comprising wireless communication instructions that, in response to being executed at the eNB, cause the eNB to transmit the one or more reference signals based on a listen before talk (LBT) protocol.

16. User equipment (UE), comprising:
logic, at least a portion of which is in hardware; and
a radio frequency (RF) transceiver;
the logic to determine a configuration of a window for receiving one or more reference signals over an unlicensed carrier, the logic to determine the configuration of the window based on configuration information received by the RF transceiver, the window comprising multiple subframes, the configuration information comprising information regarding positioning of the one or more reference signals in one or more selected subframes of the window, the logic to determine a serving cell of the UE is configured to perform opportunistic transmission of the one or more reference signals within the window;
the radio frequency (RF) transceiver to monitor the unlicensed carrier for the one or more reference signals during the window;
the logic to perform a detection operation on transmissions received on the unlicensed carrier within the window to recover the one or more reference signals transmitted in one or more subframes of the window different from the selected subframes when the unlicensed carrier is not available during the selected subframes of the window.

17. The UE of claim 16, the logic to recover the one or more reference signals by comparing the transmissions received to one or more known fixed patterns representative of the one or more reference signals.

18. The UE of claim 16, the window to correspond to at least one of a discovery measurement timing configuration (DMTC) occasion and a discovery signal (DRS) occasion.

19. The UE of claim 16, the window to comprise at least one of a window periodicity and a window duration.

* * * * *